US006730839B2

(12) United States Patent
Itou

(10) Patent No.: US 6,730,839 B2
(45) Date of Patent: May 4, 2004

(54) SILENT SYSTEM WITH SPLIT HAMMER STOPPER AND KEYBOARD MUSICAL INSTRUMENT HAVING THE SAME

(75) Inventor: Katsuo Itou, Shizuoka (JP)

(73) Assignee: Yamaha Corporation, Shizuoka-ken (JP)

( * ) Notice: Subject to any disclaimer, the term of this patent is extended or adjusted under 35 U.S.C. 154(b) by 43 days.

(21) Appl. No.: 10/266,268

(22) Filed: Oct. 8, 2002

(65) Prior Publication Data

US 2003/0110897 A1 Jun. 19, 2003

(30) Foreign Application Priority Data

Dec. 13, 2001 (JP) ....................................... 2001-379759

(51) Int. Cl.[7] ................................................ G01H 1/32
(52) U.S. Cl. ........................................... 84/719; 84/216
(58) Field of Search ............................ 84/719, 216–224

(56) References Cited

U.S. PATENT DOCUMENTS 5,844,154 A 12/1998 Kimble
6,162,980 A * 12/2000 Kitashima et al. ........ 84/423 R
6,265,647 B1 * 7/2001 Tamaki et al. ................ 84/216
6,362,414 B1 * 3/2002 Fujisawa et al. ............ 136/256
6,452,079 B2 * 9/2002 Sugiyama et al. ........ 84/423 R
6,515,213 B2 * 2/2003 Muramatsu et al. .......... 84/687

* cited by examiner

*Primary Examiner*—Kimberly Lockett
(74) *Attorney, Agent, or Firm*—Harness, Dickey & Pierce, PLC

(57) ABSTRACT

A composite keyboard musical instrument comprises an acoustic piano and a silent system, and the silent system includes a hammer stopper split into two parts assigned to higher/middle pitched parts and a lower pitched part, respectively, and a timing changer for accelerating escape of jacks; although the two parts are independently rotatably supported by bearing units, two transmission mechanisms are used in parallel for transmitting torque from only one electric motor to the two parts and timing changer so that the power transmission system is simple.

21 Claims, 12 Drawing Sheets

SILENT SYSTEM WITH SPLIT HAMMER STOPPER AND KEYBOARD MUSICAL INSTRUMENT HAVING THE SAME

FIELD OF THE INVENTION

This invention relates to a keyboard musical instrument and, more particularly, to a silent system to be installed in a composite keyboard musical instrument and a composite keyboard musical instrument for selectively performing a piece of music in acoustic tones and in electronic tones.

DESCRIPTION OF THE RELATED ART

The composite keyboard musical instrument is equipped with a hammer stopper. The user instructs the composite keyboard musical instrument to change the hammer stopper between a free position and a blocking position before his or her performance. A user is assumed to perform a piece of music in acoustic tones. The user instructs the composite keyboard musical instrument to change the hammer stopper to the free position. The composite keyboard musical instrument maintains the hammer stopper out of the trajectories of the hammers so that the hammer stopper does not impede the hammer motion. While the user is fingering a passage on the keyboard, the depressed keys give rise to the free rotation of the hammers, and the hammers strike the strings. The strings vibrate for generating the acoustic tones. On the other hand, when the user wants to practice the fingering without the acoustic tones, he or she instructs the composite keyboard musical instrument to change the hammer stopper to the blocking position. Then, the hammer stopper is moved into the trajectories of the hammers. In this situation, even though the user practices the fingering on the keyboard, the hammers rebound on the hammer stopper before striking the strings, and any acoustic tone is never generated. A set of key sensors monitors the keys, and periodically reports the current key positions to a controller. The controller analyzes the pieces of positional data information to see whether or not the user depresses and releases any one of the keys. If the controller notices the user depressing a key, the controller produces music data codes representative of an electronic tone to be generated, and the electronic tone is, by way of example, generated by a headphone. On the other hand, when the controller notices the user releasing the key, the controller produces a music data code representative of the decay of the electronic tone, and the electronic tone is decayed. Thus, the composite keyboard musical instrument permits the user to practice the fingering without disturbance to the neighborhood. The state to permit the user to perform in acoustic tones is hereinbelow referred to as "acoustic sound mode", and the state to permit the user to practice fingering without the acoustic tones is referred to as "silent mode".

When a user depresses a key, the associated action unit gives rise to rotation of the hammer around the associated flange. The jack escapes from the associated hammer when it is brought into contact with the regulating button. The hammer starts the free rotation through the escape. The escape from the hammer causes pianists to feel the key touch unique. For this reason, the hammers are to rebound on the hammer stopper after the escape and before striking the strings. The distance between the hammer shank at the escape and that at the strike is so short that the manufacturer encounters a difficulty in appropriately locating the hammer stopper. It is said that the distance is of the order of 2 millimeters. If the hammer stopper is too close to the rest positions, the hammers are brought into contact with the hammer stopper before the escape, and the hammers are pinched between the jack and the hammer stopper. On the other hand, if the hammer stopper is widely spaced from the rest positions, the tips of the hammers reach the strings, and the hammer stopper imperfectly prevents the strings from the hammers.

In order to perfectly prevent the strings from the hammers without changing the key touch, the manufacturer changes the timing to escape in the silent mode earlier than that in the acoustic sound mode. However, the solution is the second best, because the pianist feels the key touch changed a little. Even so, the solution is realistic, and a prior art composite keyboard musical instrument is equipped with a means for changing the escape timing.

The prior art means for changing the escape timing is implemented by a spacer and an actuator connected thereto. The spacer is flexible, and is swingably supported by the shank flange rail. The solenoid-operated actuator urges the spacer to enter the space between the toes and the regulating buttons, and evacuates the spacer from the space. Thus, the spacer is moved into and out of the trajectories of the toes of the jacks.

While the user is playing a piece of music in the acoustic sound mode, the solenoid-operated actuator keeps the spacer out of the trajectories of the toes, and the toes are directly brought into contact with the regulating buttons so as to give rise to the escape at the usual timing.

When the user establishes the composite keyboard musical instrument in the silent mode, the solenoid-operated actuator urges the spacer to enter the trajectories of the toes. In this situation, the user is assumed to depress a key. The front position of the key is sunk, and, accordingly, the rear portion of the key is raised. The rear portion pushes the whippen assembly so as to give rise to the rotation around the associated flange. The toe is getting closer to the regulating button, and is firstly brought into contact with the spacer. The spacer is resiliently warped, and is brought into contact with the regulating button. Then, the jack is rotated around the whippen assembly, and escapes from the hammer. Thus, the spacer hastens the escape of the jack.

The users appreciate the prior art composite keyboard musical instrument equipped with the means for changing the escape timing, and practice the fingering on the keyboard in the silent mode in the key touch close to that in the acoustic sound mode. The means for changing the escape timing is simply referred to as "timing changer" hereinbelow.

The composite keyboard musical instrument is manufactured and sold in the market. Persons who begin pianos may select the composite keyboard musical instrument instead of the acoustic piano. However, the users who have already owned acoustic pianos may attach themselves to the familiar acoustic pianos. Other users may think the composite keyboard musical instrument expensive. For this reason, the manufacturer receives the order for retrofitting the acoustic piano to the composite keyboard musical instrument.

The manufacturer usually sends workers to user's home, and retrofits the acoustic piano to the composite keyboard musical instrument thereat. The hammer stopper, the timing changer and the electronic tone generating system are to be installed in the acoustic piano at user's home. This means that only portable tools and jigs are available for the retrofitting works. The prior art hammer stopper is as long as the array of hammers so that the workers have a difficulty in assembling the long hammer stopper with the acoustic piano. For this reason, the retrofitting works are not easy. In other words, the workers wish the hammer stopper, the timing changer and the electronic tone generating system to be easy to build.

Another difficult work is to form a hole in a projection. FIG. 1 shows a standard grand piano 1. The standard grand piano has a keyboard 2, and a metal beam 3 extends in the lateral direction. Though not shown in FIG. 1, an array of action units and hammers are installed in the space between the keyboard 2 and the metal beam 3*a*, and strings are stretched over the hammers. Although an iron plate reinforces a wood frame, the strings exert a large amount of tension on the iron plate. A projection 3 is formed on the iron plate in order to restrict deformation. The projection 3 occupies a part of the space over the hammers. In the work of retrofitting the grand piano 1 to the composite keyboard musical instrument, the workers install a hammer stopper 4 into the space. However, the projection 3 crosses the space to be occupied by the hammer stopper 4. The workers machine the projection 3 for forming a hole therein, and pass the hammer stopper 4 through the hole. Since the workers are to form the hole with a portable machine, a large amount of time and labor is required for the machining.

Still another difficulty encountered in the retrofitting work is the dispersion in height of the strings. The strings are measured from the upper surface of the key bed to the lowest points of the strings, and the distance therebetween is defined as "height". The manufacturer adjusted the height to a target value, and delivered the grand piano. However, a large amount of tension has been continuously exerted on the iron frame, and the iron frame tends to be deformed. The deformation is usually observed in old pianos. The deformation is causative of the dispersion in the height of the strings. When the manufacturer receives the order for retrofitting the old piano to the composite keyboard musical instrument, the workers install the hammer stopper inside the piano case, and try to locate the hammer stopper at the appropriate position where the hammers rebound after the escape and before reaching the strings. However, if the dispersion in height has been taken place, the workers hardly pass the hammer stopper through the positions appropriate to the individual hammers.

SUMMARY OF THE INVENTION

It is therefore an important object of the present invention to provide a silent system, which is simple and makes a work for retrofitting an acoustic keyboard musical instrument to a composite keyboard musical instrument easy.

It is also an important object of the present invention to provide a composite keyboard musical instrument, which is equipped with the silent system.

The present inventors contemplated the problems inherent in the prior art silent system and the prior art composite keyboard musical instrument. First, the inventors split the hammer stopper into two parts, and installed the two parts on both sides of the projection 3 together with the timing changer and the electronic tone generating system. However, the split hammer stopper and the timing changer required individual link mechanisms. The individual link mechanisms consisted of bulky links, individual actuators. Even though an actuator was shared between the split hammer stopper and the timing changer, the actuator was to be connected to the two parts of the split hammer stopper and the timing changer through three series of links. The link mechanism for the split hammer stopper and the link mechanism for the timing changer caused the internal arrangement tight and complicated, and the retrofitting work consumed a large amount of time and labor.

The present inventors thought it preferable to reduce the bulky links, and developed a new mechanism for the split hammer stopper and the timing changer.

In accordance with one aspect of the present invention, there is provided a composite keyboard musical instrument selectively entering an acoustic sound mode and another mode for reducing the loudness of acoustic tones comprising plural keys respectively assigned pitches different from one another and independently moved between respective rest positions and respective end positions, plural vibratory members respectively associated with the plural keys for generating the acoustic tones having the pitches identical with the pitches assigned to the associated keys in the acoustic sound mode, plural vibration generators associated with the plural vibratory members, respectively, and selectively moved along respective trajectories for generating vibrations in the associated vibratory members, plural action units respectively connected between the plural keys and the plural vibration generators and causing the associated vibration generators to initiate the motion along the trajectories at a timing on the way toward the end positions after the associated keys start the motion toward the end positions, and a silent system including a stopper provided between the plural vibratory members and the plural vibration generators for causing the vibration generators to rebound thereon in the aforesaid another mode and split into plural parts independently movable between respective free positions in the acoustic sound mode and respective blocking positions in the aforesaid another mode, an actuator for generating a power, a timing changer for changing the timing at which the vibration generators initiate the motion and plural transmission mechanisms selectively connected in parallel between the plural parts and the timing changer and transmitting the power to the plural parts for concurrently changing the plural parts between the respective free positions and the respective blocking positions and to the timing changer for causing the timing changer to change the timing.

BRIEF DESCRIPTION OF THE DRAWINGS

The features and advantages of the silent system and the composite keyboard musical instrument will be more clearly understood from the following description taken in conjunction with the accompanying drawings, in which.

DESCRIPTION OF THE PREFERRED EMBODIMENTS

First Embodiment

Figure 2:
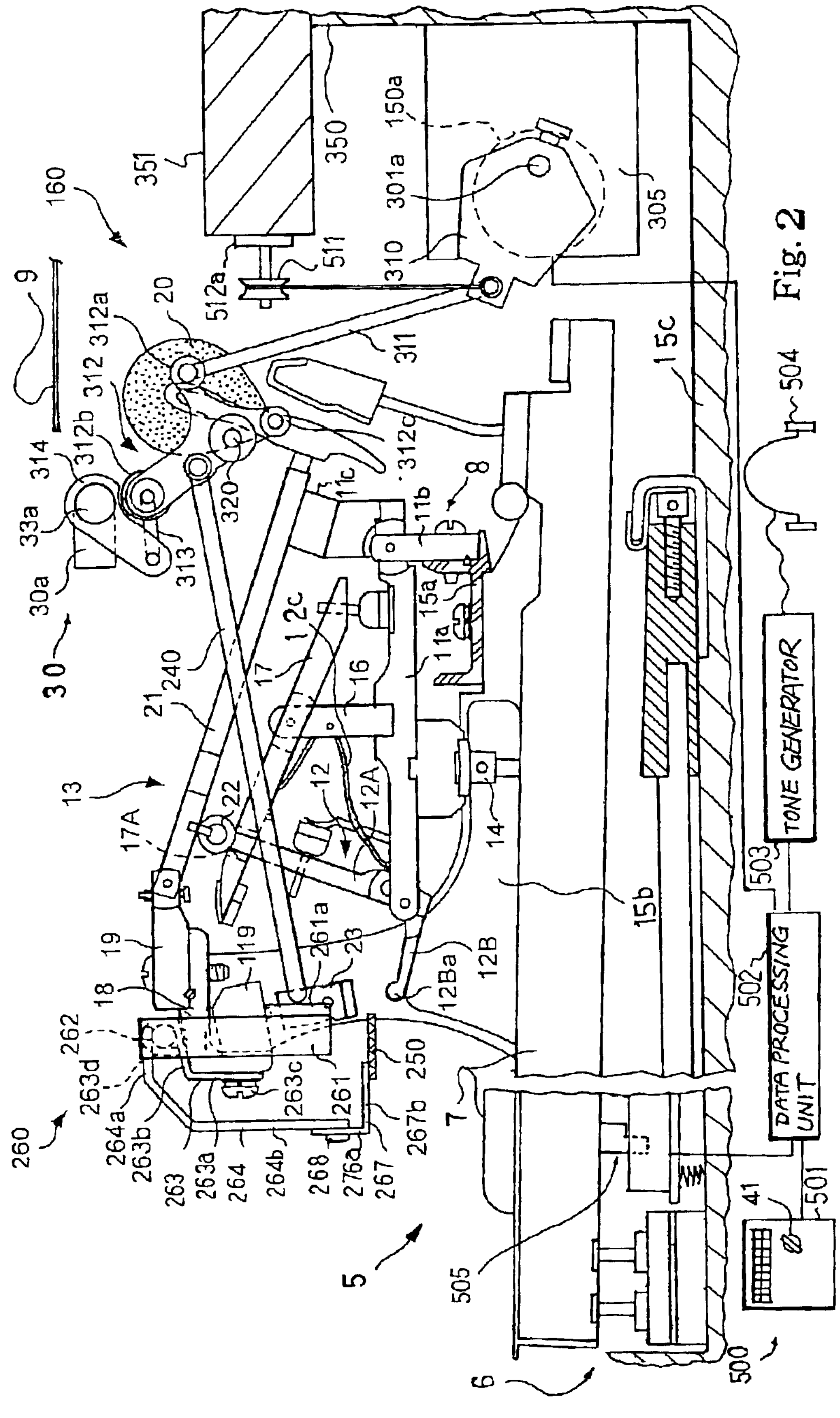
FIG. 2 is a die view showing an essential part of a composite keyboard musical instrument according to the present invention viewed from the highest register.

Referring to FIG. 2 of the drawings, a composite keyboard musical instrument embodying the present invention largely comprises an acoustic piano 5 and a silent system 6. In this instance, the acoustic piano 5 is a grand piano, and the silent system 6 allows a pianist selectively to play a piece of music in acoustic tones and in electronic tones. When the pianist selects the acoustic tones, the composite keyboard musical instrument is established in an acoustic sound mode. On the other hand, the pianist practices fingering without the acoustic tones in a silent mode. Thus, the composite keyboard musical instrument is changed between the acoustic sound mode and the silent mode.

Acoustic Piano

The acoustic piano 5 includes plural keys 7, plural action units 8, plural sets of strings 9 and hammers 13. Black keys 7 and white keys 7 are laid on the well-known pattern, and are rotatable about a balance rail (not shown). Notes of a scale are respectively assigned to the black/white keys 7. The sets of strings 9 are vibratory for generating the acoustic tones to which the notes are assigned, respectively. Thus, a pianist specifies the strings through the black/white keys 7. Though not shown in FIG. 2, the acoustic piano 5 further includes dampers, and the dampers are spaced from and brought into contact with the strings 9 as similar to those of a standard grand piano.

The action units 8 are respectively associated with the black/white keys 7, which in turns are associated with the hammers 13, respectively. The action units 8 are provided over the black/white keys 7, and the black/white keys 7 are connected to the associated action units 8 through capstan screws 14, respectively. When the pianist depresses a white key 7, the depressed white key 7 actuates the associated action unit 8 so as to give rise to free rotation of the associated hammer 13. The hammer 13 strikes the associated set of strings 9 at the end of the free rotation, and rebounds on the strings 9.

The action units 8 are similar in structure to one another. Each of the action units 8 includes a whippen assembly 11, a jack 12, a repetition lever flange 16, a repetition lever 17 and a regulating button 23. The whippen assembly 11 is rotatably connected at one end thereof to a whippen flange 11*b*, and is held in contact with the associated capstan screw 14 by virtue of the self-weight. The whippen flange 11*b* in turn is fixed to a whippen rail 15*a*, and the whippen rail 15*a* laterally extends over the rear portions of the black/white keys 7. The whippen rail 15*a* is supported by action brackets 15*b*, and the action brackets 15*b* are fixed to bracket blocks (not shown) placed on a key bed 15*c*. Thus, the action brackets 15*c* and, accordingly, the whippen rail 15*a* are stationary on and over the key bed 15*c*, and the whippen assembly 11*a* is rotatable about the whippen flange 11*b*.

The repetition lever flange 16 is fixed to an intermediate portion of the whippen assembly 11*a*, and upwardly projects therefrom. The repetition lever 17 is rotatably connected to the upper end of the repetition lever flange 16, and a through-hole 17A is formed in one end portion of the repetition lever 17. The jack 12 has a leg portion 12A and a foot portion 12B, and is rotatably supported by the other end of the whippen assembly 11*a* at the ankle portion. The leg portion 12A has a leading end inserted into the through-hole 17A, and the foot portion 12B is formed with a toe 12Ba.

A repetition spring 12*c* always urges the jack 12 and the repetition lever 17 in the clockwise direction so that the jack 12 and the repetition lever 17 keep themselves on the whippen assembly 11*a* without any relative motion. For this reason, the jack 12 is rotated about the whippen flange 11*b* during the rotation of the whippen assembly 11*a*, and the toe 12Ba is moved on a predetermined trajectory. The regulating button 23 is located on a certain position on the trajectory of the tow 12Ba, and is hung from a regulating rail 119. The regulating rail 119 extends in the lateral direction, and is shared with other regulating buttons 23. A shank flange rail 18 is fixed to the action brackets 15*b*, and extends over the middle portions of the black/white keys 7 in the lateral direction. The regulating rail 119 is fixed to the shank flange rail 19, and the regulating button 23 is projectable toward the toe 12Ba and rectactable toward the regulating rail 119. For this reason, the gap between the regulating button 23 and the toe 12Ba is variable.

The hammers 13 are also similar in structure to one another. Each of the hammers 13 is broken down into a shank flange 19, a hammer felt 20, a hammer shank 21 and a roller 22. The shank flange 19 is fixed to the shank flange rail 18, and the hammer shank 21 is rotatably connected to the shank flange 19. The hammer felt 20 is fixed to the leading end of the hammer shank 21, and is opposed to the associated string 9. The roller 22 is rotatably connected to the hammer shank 21. When the hammers 13 are in the rest positions, the rollers 22 are held in contact with the upper end surfaces of the legs 12A, respectively.

A pianist is assumed to depress the front portion of the white key 7. The front portion is sunk, and, accordingly, the rear portion is raised. The capstan screw 14 pushes the whippen assembly 11*a* upwardly, and gives rise to the rotation of the whippen assembly 11*a* about the whippen flange 11*b* in the clockwise direction. The jack 12 and the repetition lever 17 are also rotated about the whippen flange 11*b* without any relative rotation between the whippen assembly 11*a* and the jack/repetition lever 12/17. The jack 12 pushes the roller 22, and gives rise to rotation of the hammer 13 about the shank flange 19. The hammer felt 20 advances toward the string 9, and the toe 12Ba is moved on the trajectory.

When the toe 12Ba is brought into contact with the regulating button 23, the jack 12 is rotated in the counter clockwise direction about the other end of the whippen assembly 11*a* so as to escape from the hammer 13. The roller 22 is kicked, and the hammer 13 starts the free rotation about the shank flange 19 in the counter clockwise direction. The hammer felt 20 rebounds on either string 9 or a hammer stopper depending upon the mode of operation. Thus, the acoustic piano 5 is similar in structure to standard grand pianos. When users wishes to retrofit the standard grand pianos the composite keyboard musical instruments, the silent system is installed in the standard grand pianos.

Silent System

The silent system 6 comprises a hammer stopper 30, an actuator 150, two transmission mechanisms 160/170, a timing changer 260 and an electronic tone generator 500. The hammer stopper 30 is changed between a free position and a blocking position by means of the transmission mechanisms 160/170, and the timing changer 260 changes the timing to escape from the hammers 13 between the acoustic sound mode and the silent mode. Only one actuator 150, which is constituted by an electric motor 150*a*, a controller 150*b* for the electric motor 150*a* and a polygonal plate 310 as will be described hereinafter, is shared between the transmission mechanisms 160/170, and gives rise to rotation of the two parts of the hammer stopper 30 through the transmission mechanisms 160/170, concurrently. The electronic tone generator 500 specifies the black/white keys 7 depressed by a pianist, and generates electronic tones.

The hammer stopper 30 stays at the free position in the acoustic sound mode, and permits the hammers 13 to strike the associated strings 9. When the composite keyboard musical instrument is changed to the silent mode, the hammer stopper 30 enters the trajectories of the hammer shanks 21. The hammer stopper 30 at the blocking position causes the hammers 21 to rebound thereon after the escape of the jacks 12 and before striking the strings 9.

The timing changer 260 causes the jacks 12 to escape from the hammers 13 in the silent mode earlier than those in the acoustic sound mode. Namely, the timing changer 260 hastens the escape of the jacks 12 in the silent mode. The electronic tone generator 500 monitors the black/white keys 7 to see whether or not a player depresses and releases the black/white keys 7, and generates electronic tones with the notes identical with those of the depressed keys 7. The hammer stopper 30, the transmission mechanisms 160/170, the timing changer 260 and the electronic tone generator 500 will be hereinbelow described in detail with reference to FIGS. 3 to 7.

Figure 3:
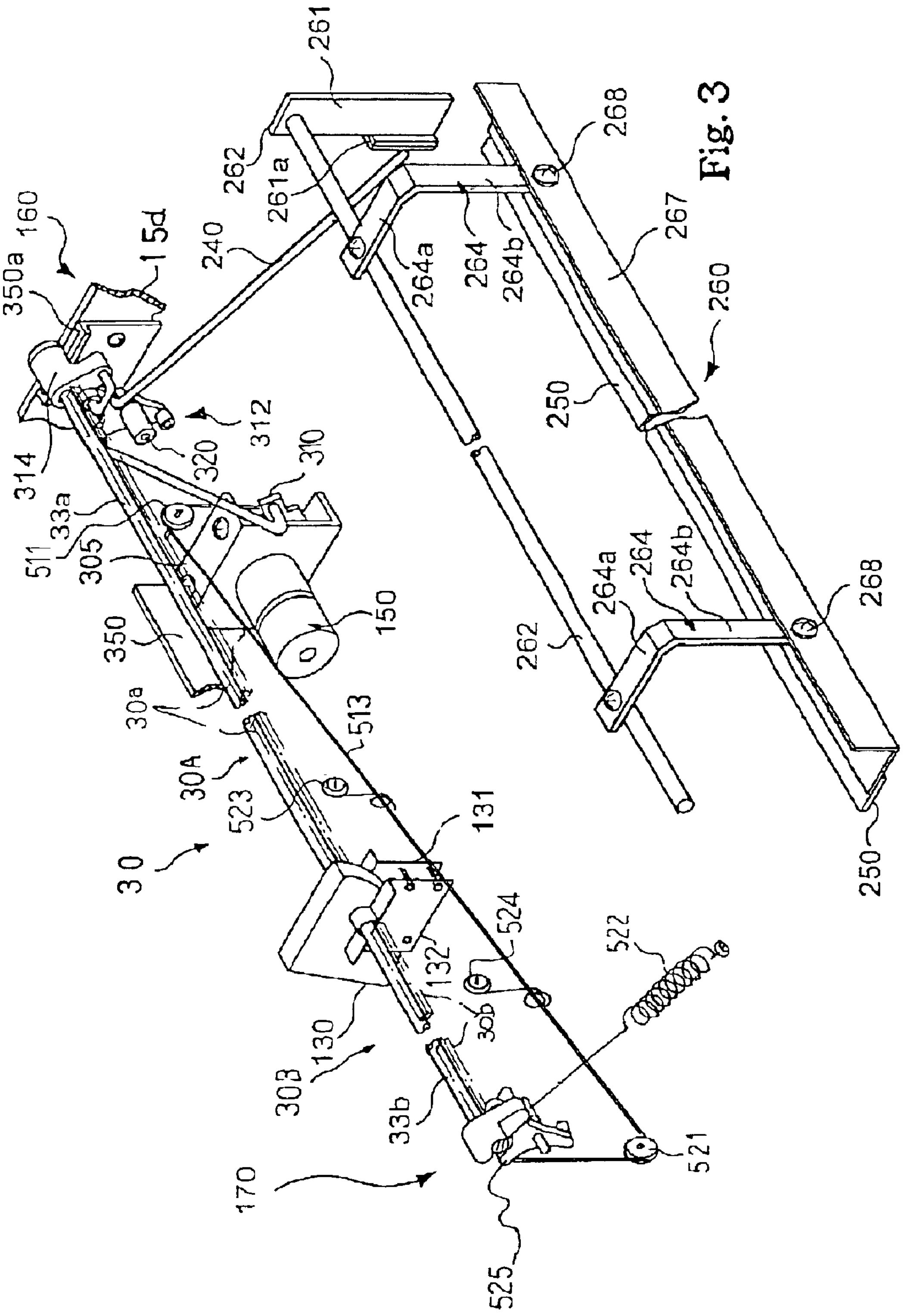
FIG. 3 is a perspective view showing the structure of a hammer stopper and a timing changer both incorporated in the composite keyboard musical instrument.

As shown in FIG. 3, the hammer stopper 30 is split into two parts 30A and 30B. The right part 30A is assigned to the hammers 13 associated with the strings 9 in high and middle registers, and is driven for rotation through the transmission mechanism 160 (see FIG. 4). On the other hand, the left part 30B is assigned to the hammers 13 associated with the strings in a low register, and is driven for rotation through the transmission mechanism 170. The hammer stopper 30 includes two impact absorbers 30*a*/30*b*, two shafts 33*a*/33*b* and two pairs of bearing units 131*b*/132*b* (see FIGS. 6 and 7). The impact absorber 30*a*, the shaft 33*a* and the pair of bearing units 131*b* form in combination the right part 30A of the hammer stopper 30, and the other impact absorber 30*b*, shaft 33*b* and pair of bearing units 132*b* as a whole constitute the left part 30B of the hammer stopper 30. In this instance, self-aligning bearing units are used as the pairs of bearing units 131*b*/132*b*.

Figure 1:
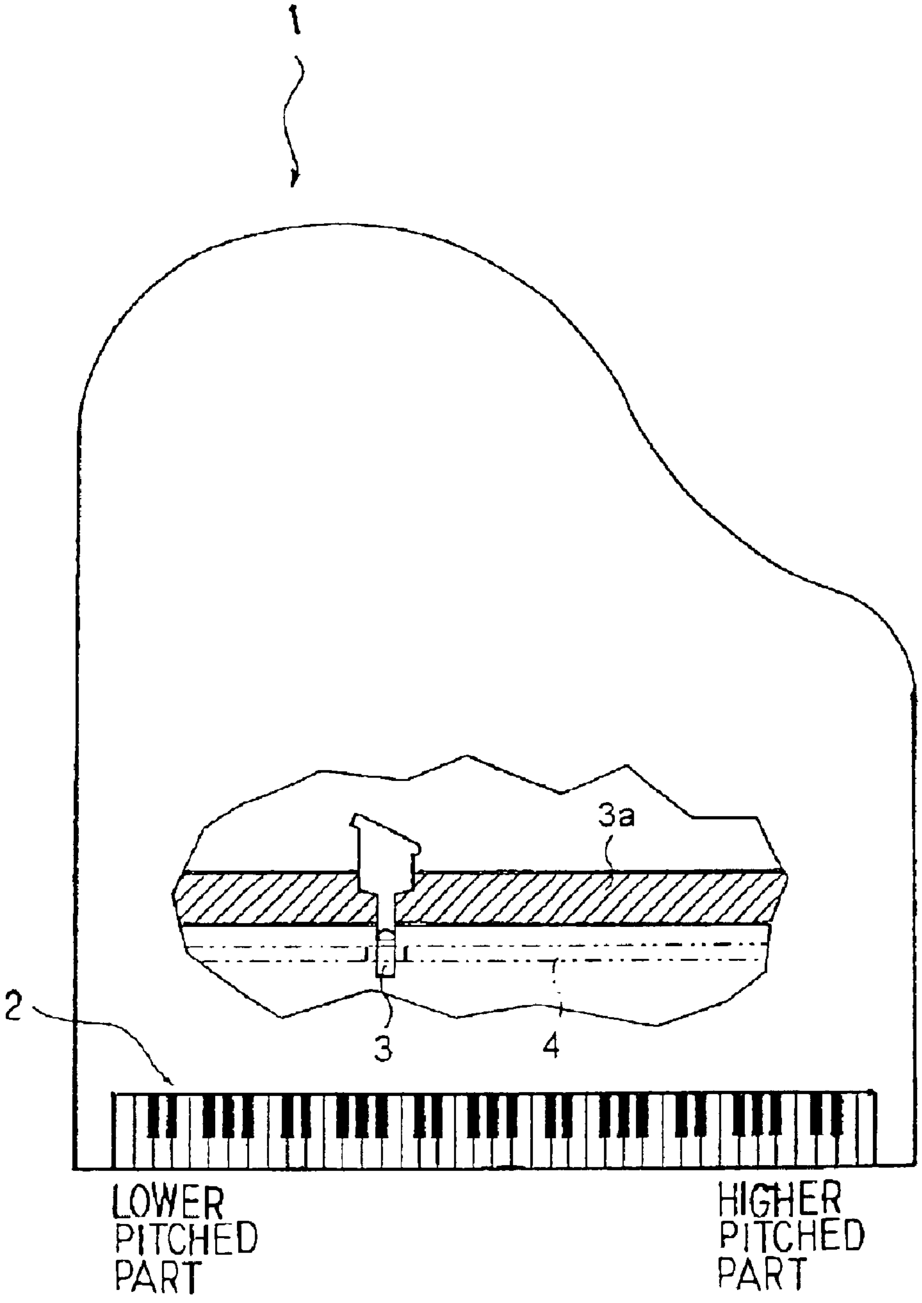
Fig. 1 PRIOR ART
FIG. 1 is a partially cut-away schematic view showing the standard grand piano.

Reference numeral 130 designates a projection corresponding to the projection 3 (see FIG. 1). The right part 30A is located on the right side of the projection 130, and the left part 30B is located on the left side of the projection 130. The action units 8, hammers 13 and the strings 9 are accommodated in a piano case, and the piano case includes a side board 15*d*. The side board 15*d* has a contour like a wing. The side board 15*d* has a curved portion and straight portions frontward projecting from both ends of the curved portion. The straight portions extend in parallel on both sides of the projection 130. Brackets 131/132 are respectively fixed to both side surfaces of the projection 130, and brackets 350*a* are fixed to the inner surfaces of the straight portions of the side board 15*d*, respectively. The bearing units 113*b* of the pair for the shaft 33*a* are respectively mounted on the bracket 350*a* and the bracket 131, and the shaft 33*a* is rotatably supported by the bearing units 113*b*. Similarly, the bearing units 132*b* for the other shaft 33*b* are respectively mounted on the bracket 132 and the other of the brackets 350*a*, and the shaft 33*b* is rotatably supported by the bearing units 132*b*. Thus, the shafts 33*a* and 33*b* are independently supported between one of the straight portions of the side board 15*d* and the projection 130 and between the projection and the other straight portion, and any through-hole is not required for the hammer stopper 30.

Figure 6:
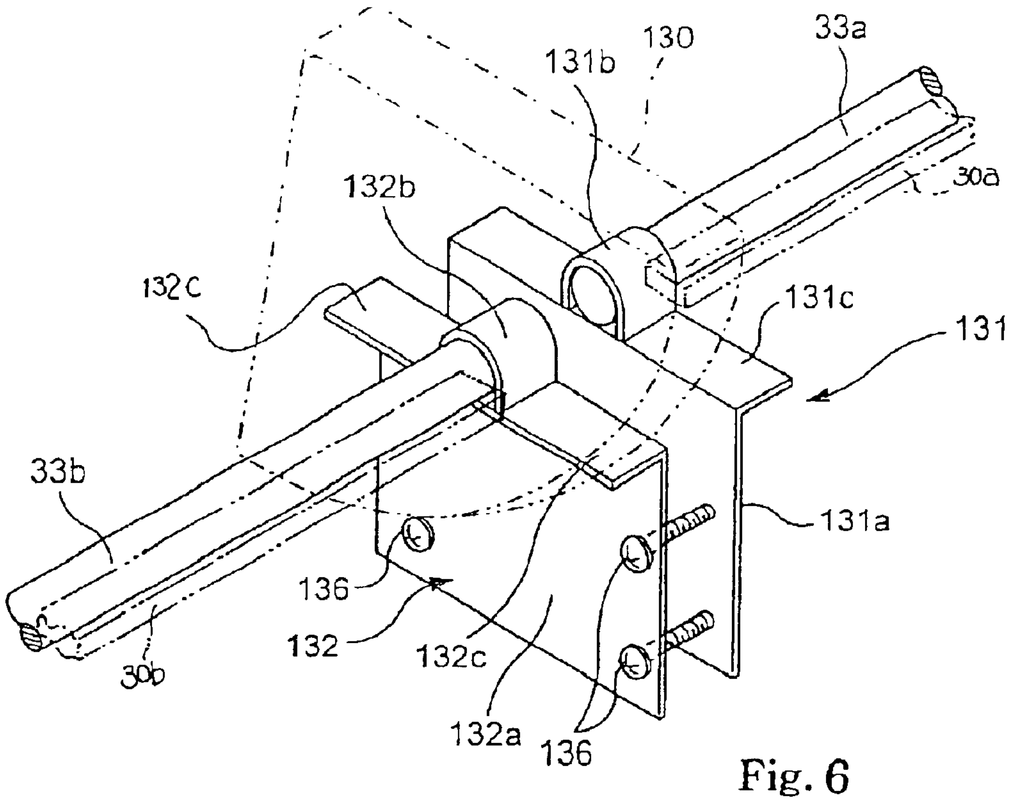
FIG. 6 is a perspective view showing two parts of the hammer stopper supported by bearing units.
Figure 7:
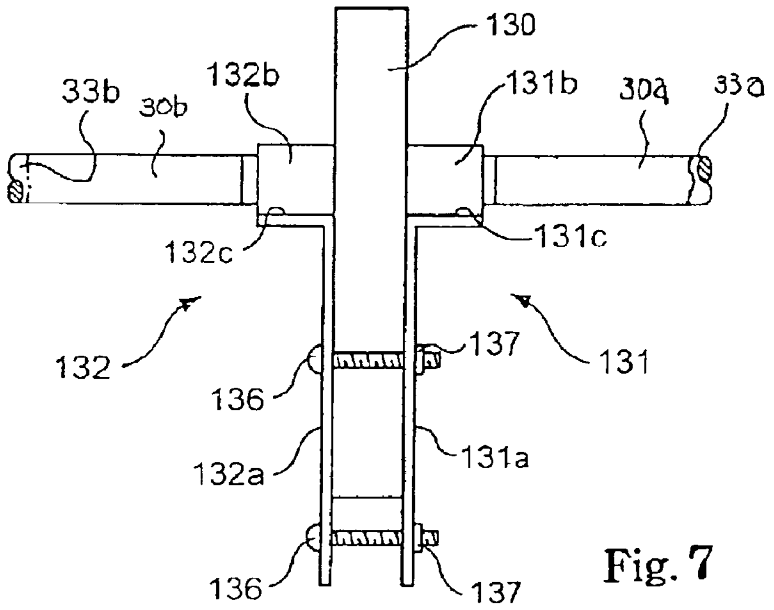
FIG. 7 is a front view showing the two parts of the hammer stopper and the bearing units.

FIGS. 6 and 7 show the brackets 131/132 attached to the projection 130. Although the hammer stopper 30 is sprit into the two parts 30A/30B, any through-hole is not required for the shafts 33*a*/33*b*. The brackets 131/132 have an L-letter shape, and, accordingly, vertical portions 131*a*/132*a* and horizontal portions 131*c*/132*c* form the L-letter shaped brackets 131/132. The vertical portions 131*a*/132*a* have a rectangular configuration, and the projection 130 has a sectoral configuration. The L-letter shaped brackets 131/132 are inverted, and the vertical portions 131*a*/132*a* are attached to the side surfaces of the projection 130. Then, vertical portions 131*a*/132*a* are partially held in contact with the side surfaces of the sectoral projection 130 and are partially faced to one another. Three pairs of holes are formed in the vertical portions 131*a*/132*a* in such a manner that the holes of the vertical portion 131*a* are aligned with the holes of the other vertical portion 132*a*. Bolts 136 pass through the three pairs of holes, and are screwed into nuts 137. The bolts 136 and the nuts 137 press the brackets 131/132 against the side surfaces of the sectoral projection 130. Thus, the brackets 131/132 are secured to the projection 130 without any machining work on the projection 130. The self-adjusting bearing units 131*b*/132*b* are mounted on the horizontal portions so as to rotatably support the shafts 33*a*/33*b* together with the self-adjusting bearing units on the brackets 350*a*.

Turning back to FIG. 2 of the drawings, the piano case further has a rear beam 350, which extends in the lateral direction between the straight portions of the side board 15*d*, and a middle beam 351 extending over the rear beam 350. The middle beam 351 frontward projects from the rear beam 350.

The electric motor 150*a* is supported by the rear beam 350 by means of a bracket 305, and has an output shaft 301*a* projecting from the motor case in the lateral direction. The polygonal plate 310 is fixed to the output shaft 301*a* at a certain point spaced from the center thereof. While the electric motor 150 is rotating the output shaft 301*a*, the polygonal plate 310 is driven for rotation together with the output shaft 301*a*. The polygonal plate 310 is connected to the transmission mechanisms 160/170, and the electric motor 150*a* concurrently gives rise to the rotation of the two parts 30A/30B and the timing changer 260. In other words, the electric motor 150*a* concurrently changes the hammer stopper 30 and the timing changer 260 depending upon the mode of operation, i.e., the acoustic sound mode and the silent mode.

Figure 4:
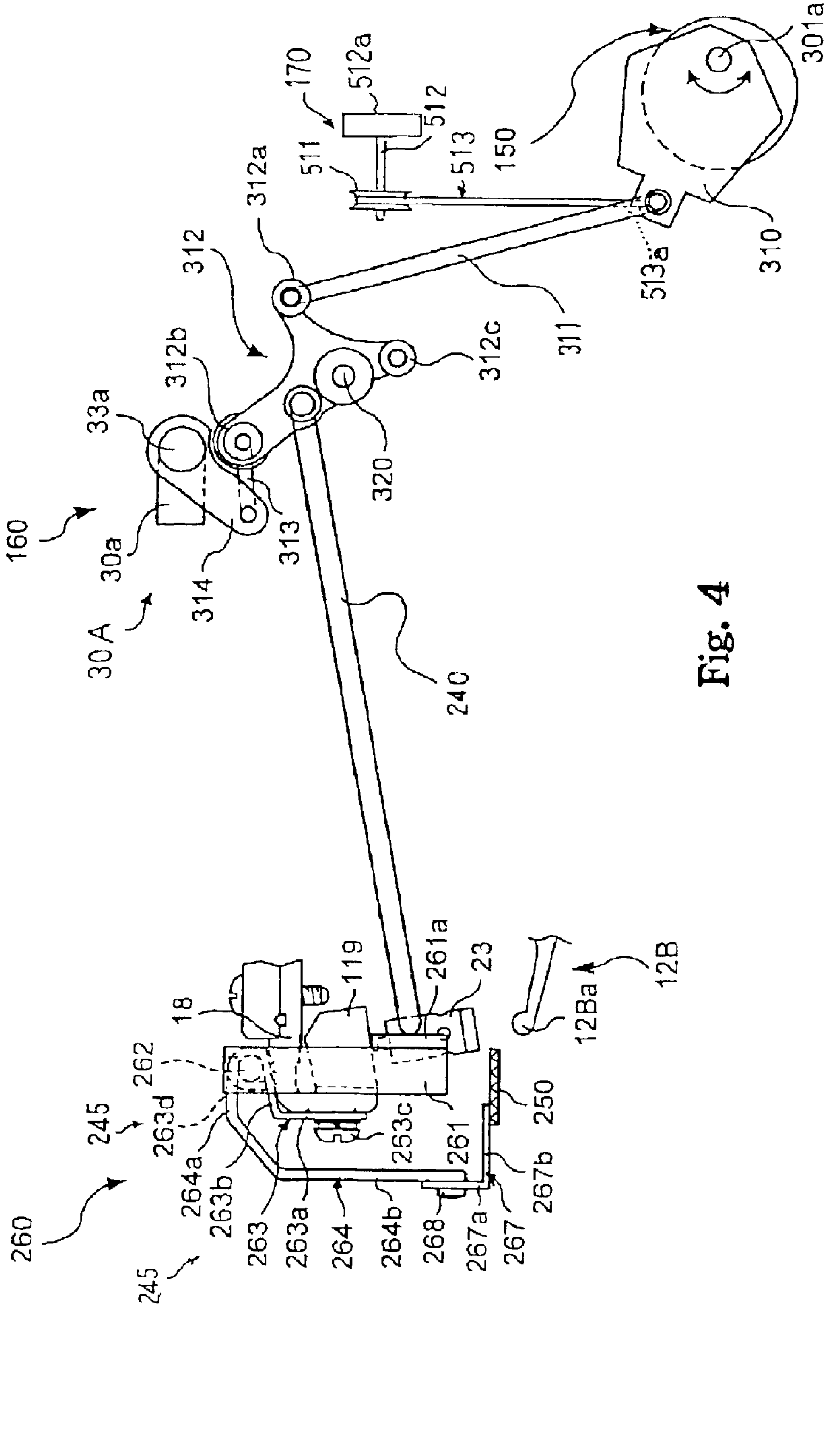
FIG. 4 is a side view showing the structure of a transmission mechanism and the timing changer.

As will be better seen in FIG. 4, the transmission mechanism 160 includes a connecting rod 311, an arm member 312, a connecting rod 313, a shaft 320 and an arm member 314. These component parts 311 to 314 transmit the torque from the polygonal plate 310 to the shaft 33*a* of the right part 30A of the hammer stopper 30, and gives rise to the rotation of the shaft 33*a*.

The connecting rod 311 is rotatably connected at one end thereof to another point also spaced from the center. While the electric motor 150*a* is rotating the output shaft 301*a*, the polygonal plate 310 is driven for rotation, and pushes or pulls the connecting rod 311 depending upon the direction of the rotation.

The arm member 312 had three projections 312*a*, 312*b* and 312*c*, and is rotatably supported by the shaft 320. The shaft 320 is fixed to the bracket 350*a* (see FIG. 3), and the arm member 314 is fixed to the shaft 33*a*. The other end of the connecting rod 311 is rotatably connected to the projection 312*a* of the arm member 312. Thus, when the connecting rod 311 is pushed or pulled by the polygonal plate 310, the arm member 312 is rotated about the shaft 320.

The connecting rod 313 is rotatably connected at one end thereof to the projection of the arm member 312 and at the other end thereof to the arm member 314. When the arm member 312 is driven for rotation in the clockwise direction, the projection 312*b* pulls the connecting rod 313, and the arm member 314 is driven for rotation in the counter clockwise direction. The impact absorber 30*a* is also rotated in the counter clockwise direction, and enters into the trajectories of the associated hammers 13. On the other hand, when the arm member 312 is driven for rotation in the counter clockwise direction, the projection 312*b* pushes the connecting rod 313, and the arm member and, accordingly, the shaft 33*a* are rotated in the counter clockwise direction. The impact absorber 30*a* is moved out of the trajectories of the associated hammers 13.

Figure 5:
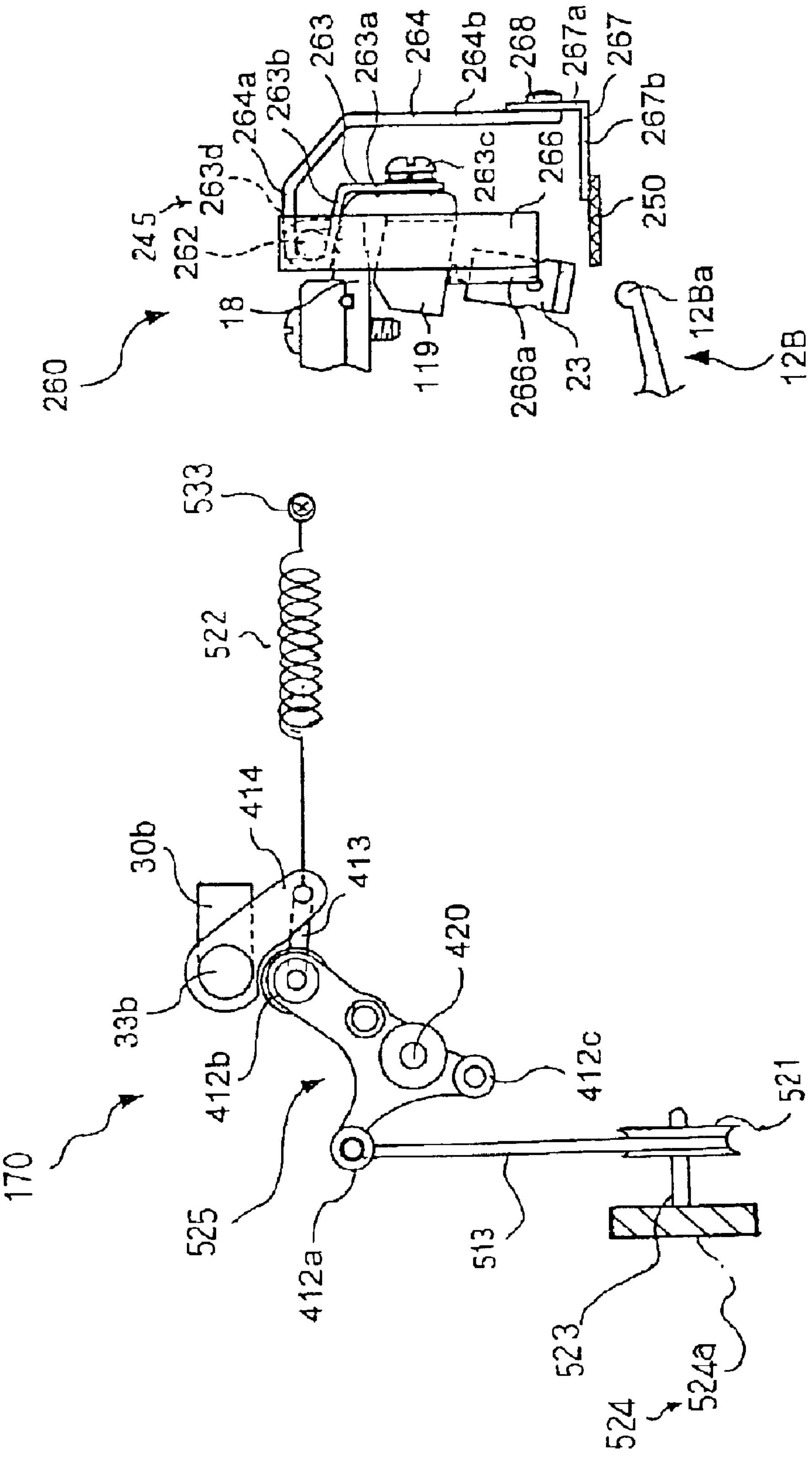
FIG. 5 is a side view showing the structure of another transmission mechanism and the timing changer.

The transmission mechanism 170 includes a pulley 511, a shaft 512, a strap 513 and guide members 523/524 (see FIG. 3), and further includes a pulley 521, a return spring 522, a shaft 523, a bracket 524, an arm 525, a connecting rod 413 and an arm 414 as shown in FIG. 5. The strap 513 may be made from yarn or a bundle of yarns, rope, silkworm gut, wire such as stranded steel wire, plastic wire or carbon wire. Any flexible material is available for the strap 513 in so far as the flexible material is less expandable.

The shaft 512 is rotatably supported by a bracket 512*a*, which in turn is secured to the middle beam 351. The shaft 512 frontward projects from the bracket 512*a*. The pulley 511 is fixed to the shaft 512 so that the shaft 512 is rotatable together with the shaft 512. The pulley 511 is positioned over the polygonal plate 310. The strap 513 is fixed at one end 513*a* thereof to the polygonal plate 310 and at the other end 513*b* there of to the arm 525. The strap 513 extends between the polygonal plate 310 and the arm 525 without slackness. The strap 513 upwardly extends from the polygonal plate 310, and is engaged with the pulley 511. The pulley 511 changes the direction of the strap 513 (see FIG. 3), and the strap 513 leftward extends toward the pulley 521.

Figure 8:
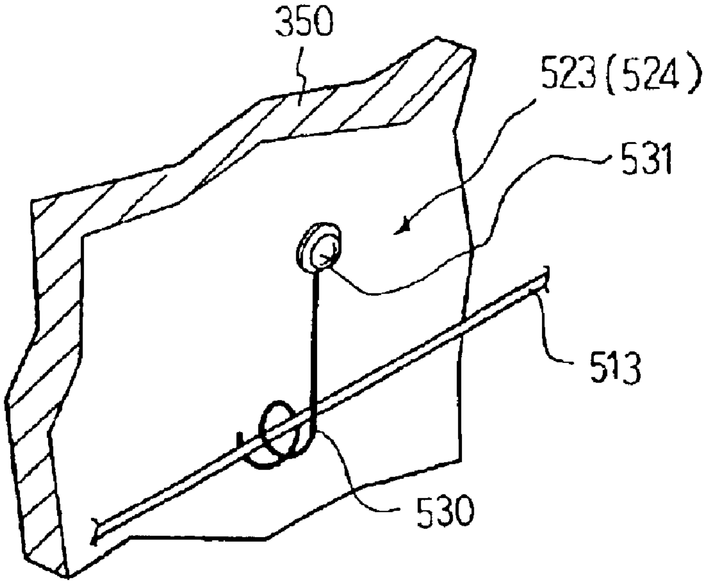
FIG. 8 is a perspective view showing a strap passing through a guide member.

The guide members 523/524 are provided in the vicinity of the projection 130, and are implemented by combinations of looped wires 530 and fasteners 531 as shown in FIG. 8. In this instance, the fastener 531 has a ring and a screw bolt. The ring is fixed to the looped wire, and is secured to the rear beam 350 by means of the screw bolt. The strap 513 passes through the looped wires 530, and is hung from the rear beam 350. The guide members 523/524 permit the strap 513 to pass through the space near the projection 130. Thus, any through-hole in the projection 130 is not required for the transmission mechanism 520.

Figure 9:
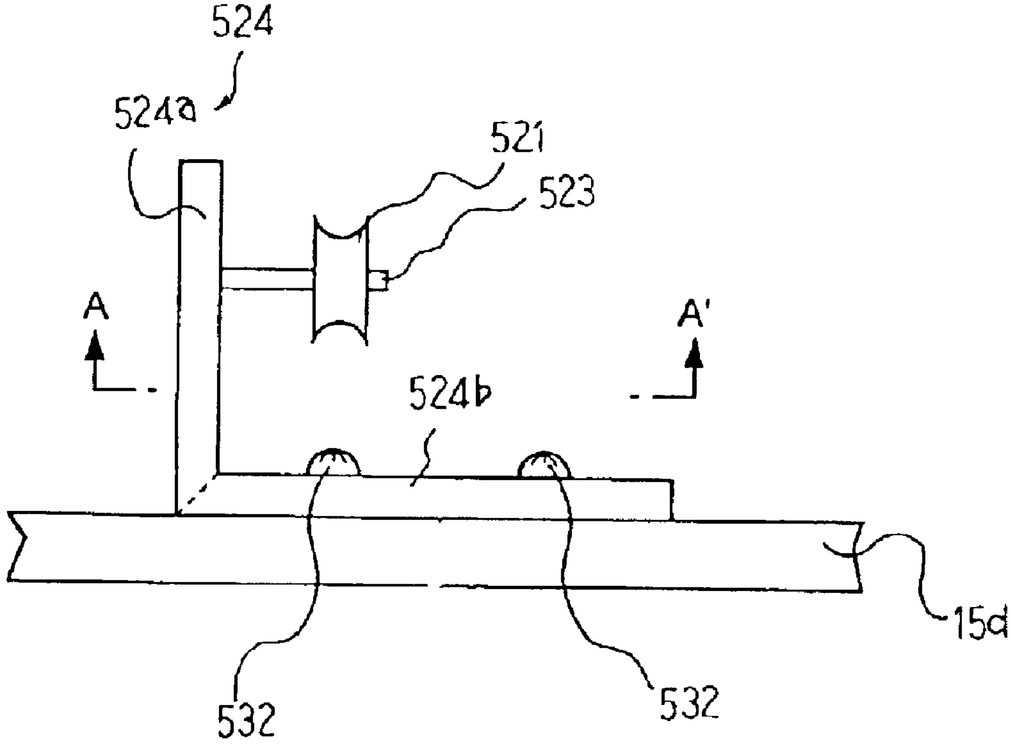
FIG. 9 is a plane view showing a pulley rotatably supported by a bracket.

The bracket 524 is like an angle (see FIG. 9), and has two portions 524*a*/524*b* merging with each other at right angles. The portion 524*b* is secured to the straight portion of the side board 51*d* by means of bolts 532. The bracket 524 shown in FIG. 9 is viewed from the space over the pulley 521, and the cross section in FIG. 5 is taken along line A–A' of FIG. 9.

The shaft 523 is rotatably supported by the bracket 524, and the pulley 521 is fixed to the shaft 523. Accordingly, the pulley 521 is rotatable together with the shaft 523. The shaft 523 frontward projects from the portion 524*a* of the bracket 524. The strap 513 passes the pulley 521, and the pulley 521 changes the direction of the strap 513. The strap 513 extends upwardly from the pulley 521, and is connected to the arm 525.

The arm 525 is same in contour as the arm 312, and has three projections 412*a*, 412*b* and 412*c*. The shaft 420 rightward projects from the straight portion of the side board 15*d*, and the arm 525 is rotatably supported by the shaft 420. The strap 513 is terminated at the projection 412*a*. The connecting rod 413 is rotatably connected at one end thereof to the projection 412*b* and at the other end thereof to the arm 414. The arm 414 is fixed to the shaft 33*b*. The return spring 522 is connected at one end portion thereof to the straight portion of the side board 15*d* by means of a bolt 533 and at the other end portion thereof to the connecting rod 413. The return spring 522 urges the arm 525 to rotate in the clockwise direction and the arm 414 to rotate in the counter clockwise direction in FIG. 5. As a result, the impact absorber 30*b* is maintained at the free position. When the strap 513 is pulled, the strap 513 gives rise to the rotation of the arm 525 in the counter clockwise direction, and the arm 525 pulls the connecting rod 413 against the elastic force of the return spring 522. Then, the arm 414 is driven for rotation in the clockwise direction, and the shaft 33*b* is rotated together with the arm 414. The impact absorber 30*b* is moved into the trajectories of the hammer shanks 21, and enters the blocking position.

The timing changer 260 largely comprises a pushing rod 240, a framework 245 and a spacer 250 as shown in FIG. 4. The framework 245 is rotatably supported at the upper portion thereof by the shank flange rail 18, and the spacer 250 is attached to the lower portion of the framework 245. The rod 240 is provided between the arm member 312 and the framework 245, and transmits the torque from the arm member 312 to the framework 245. In this instance, the pushing rod 240 is connected to the middle point between the tip of the projection 312*b* and the tip of the projection 312*c*. When the arm member 312 is driven for rotation in the clockwise direction, the pushing rod 240 is pulled so as to give rise to rotation of the framework 245 in the counter clockwise direction. As a result, the spacer 250 enters the trajectories of the toes 12Ba. On the other hand, when the arm member 312 is driven for rotation in the counter clockwise direction, the pushing rod 240 is pushed so as to rotate the framework 245 in the clockwise direction. The spacer 250 is moved out of the trajectories of the toes 12Ba. Thus, the timing changer 260 is changed concurrently with the hammer stopper 30.

The spacer 250 is, by way of example, rubber, felt or cloth, and, accordingly, is flexible. Even though the spacer 250 is slightly spaced form the regulating buttons on the trajectories of the toes 12Ba, the toe 12Ba deforms the spacer 250 until the spacer 250 is brought into contact with the regulating button 23, and, thereafter, the reaction makes the jack 12 to turn about the whippen assembly 11*a*. Thus, the timing changer 260 hastens the escape by a time equivalent to the thickness of the spacer 250.

The structure of the framework 245 is hereinbelow described in detail. The framework 245 comprises an arm 261 (see FIG. 3), a shaft 262, bearing units 263 (see FIG. 4), connecting plates 264 and a retainer 267 (see FIG. 3, again). Each of the bearing units 263 is broken down into a vertical portion 263*a*, a bearing portion 263*d* and a support portion 263*b*. The vertical portion 263*a* and the support portion 263*b* are held in contact with the front and upper surfaces of the shank flange rail 18, and keep the bearing portion 263*d* on the shank flange rail 18. The vertical portion 263*a* is secured to the shank flange rail 18 by means of a bolt 263*c*, and the bearing portion 263*d* is disposed on the upper surface of the shank flange rail 18. Thus, the bearing units 263 are secured to the shank flange rail 18 by means of bolts 263*c* at intervals, and the shaft 262 is rotatably supported on the shank flange rail 18 by the bearing portions 263*d*.

The arm 261 is connected to the right end of the shaft 262, and downwardly project from the shaft 262. The arm 261 is rotatable together with the shaft 262. Though not shown in the drawings, a spring is connected between the arm 261 and a support rail, and the arm 261 is always urged in the counter clockwise direction in FIG. 4. A pad 261*a* is fixed to the lower portion of the arm 262, and the pushing rod 240 is held in contact with the pad 261*a*. When the arm 312 is rotated in the counter clockwise direction, the pushing rod 240 pushes the pad 261*a* against the elastic force of the spring, and rotates the arm 261 and, accordingly, the shaft 262 in the clockwise direction. On the other hand, when the arm 312 is rotated in the clockwise direction, the pushing rod 240 removes the force from the pad 261, and the spring gives rise to the rotation of the arm 261 and the shaft 262 in the counter clockwise direction.

The retainer 267 is laterally extends in the vicinity of the regulating buttons 23, and the connecting plates 264 are connected between the shaft 262 and the retainer 267. Each of the connecting plates 264 has a curved portion 264*a* and a straight portion 264*b* downwardly extending from the curved portion 264*a*. The retainer 267 has an L-letter shape, and has two portions 267*a* and 267*b* crossing each other at 90 degrees. The curved portions 264*a* are secured to the shaft 262 by means of bolts 268 so that the straight portions 264*b* downwardly extend. The spacer 250 is, by way of example, adhered to the portion 267*b* of the retainer 267. Thus, the connecting plates 264 and the retainer 267 keep the spacer 250 in the vicinity of the regulating buttons 23

While the arm 312 is keeping the pushing rod 240 pushing the pad 261*a* against the elastic force of the spring, the spacer 250 is out of the trajectories of the toes 12Ba. The arm 312 is assumed to cause the framework 245 to rearward tract the pushing rod 240. The framework 245 is rotated in the counter clockwise direction in FIG. 4, and moves the spacer 250 into the space beneath the regulating buttons 23, i.e., into the trajectories of the toes 12Ba.

Figure 10:
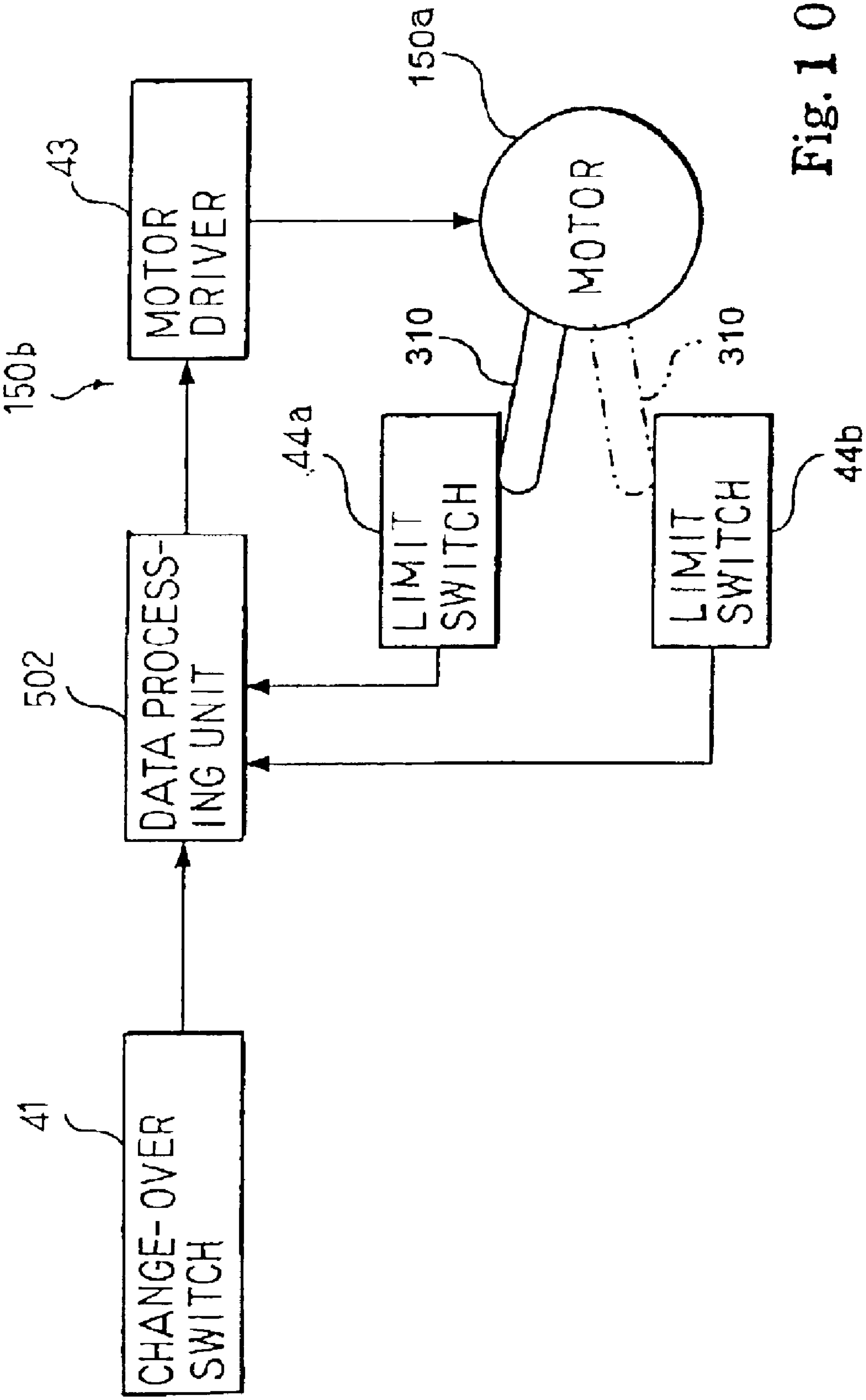
FIG. 10 is a block diagram showing the system configuration of a controller for an electric motor.

As described hereinbefore, the actuator 150 is incorporated in the silent system 6. The actuator 150 includes the electric motor 150*a*, the controller 150*b*, a change-over switch 41 and a data processing unit 502. Users give their instructions to the silent system 6 through the change-over switch 41, and the instructions are relayed from the change-over switch 41 to the data processing unit 502 as shown in FIG. 10. The change-over witches 41 is provided on a switch panel 501 together with other switches, indicators and a display window (see FIG. 2), and the manipulating panel 501 and data processing unit 502 are shared with the electronic tone generator 500. The data processing unit 502 includes a central processing unit, a program memory, which is usually implemented by ROM, and a working memory such as RAM. The central processing unit executes programs of selected one of the routines, and makes the data processing unit 502 to achieve a given task. The switch panel 501 is attached to the piano case in the vicinity of the chair such as, for example, the front surface of the key bed 15*c*.

The user manipulates the change-over switch 41 so as to establish the composite keyboard musical instrument selectively in the acoustic sound mode and the silent mode. A mode signal representative of the selected mode is supplied from the change-over switch 41 to the data processing unit 502. The data processing unit 502 interprets the mode signal, and determines the mode of operation. The data processing unit 502, controller 150*b* and electric motor 150*a* form a control loop, and carry out the instructions through the control loop.

The controller 150*b* includes a motor driver 43 and a pair of limit switches 44*a*/44*b*. The motor driver 43 is responsive to a control signal supplied from the data processing unit 502 for energizing the electric motor 150*a* with a driving voltage. The electric motor 150*a* is drive for rotation in either direction, i.e., the clockwise direction or counter clockwise direction depending upon the polarity of the driving voltage. As described hereinbefore, the polygonal plate 310 is fixed to the output shaft of the electric motor 150*a*, and is rotated along a trajectory. The limit switches 44*a* and 44*b* are provided in the trajectory of the polygonal plate 310, and supply detecting signals indicative of the arrival of the polygonal plate 310. The data processing unit 502 instructs the motor driver 43 to stop the driving current.

One of the ends, where the limit switch 44*b* is provided, is corresponding to the blocking position of the hammer stopper 30, and the other end, at which the other limit switch 44*a* is provided, is corresponding to the free position of the hammer stopper 30. When the polygonal plate 310 causes the limit switch 44*a* to turn on, the impact absorbers 30*a*/30*b* reach the free position, and the spacer 250 is moved out of the space beneath the regulating button 23. On the other hand, when the polygonal plate 310 kicks the other limit switch 44*b* the impact absorbers 30*a*/30*b* and spacer 250 enter the blocking position and the space beneath the regulating buttons 23.

The data processing unit 502 has a signal port, and the mode signal representative of the silent mode is assumed to arrive at the signal port. The data processing unit 502 periodically checks the signal port to see whether or not any one of the signals is changed. When the mode signal representative of the silent mode arrives at the signal port, the data processing unit 502 acknowledges the instruction from the user, and supplies the control signal representative of the silent mode to the motor driver 43. The motor driver 43 determines the direction in which the electric motor 150*a* is to rotate the output shaft 301*a*, and adjusts the driving voltage to the proper polarity. The motor driver 43 supplies the driving voltage to the electric motor 150*a*. Then, the electric motor 150*a* starts to rotate the output shaft 301*a* in the counter clockwise direction in FIG. 10. The torque is transmitted through the transmission mechanisms 160/170 to the two parts 30A/30B of the hammer stopper 30 and the timing changer 260. The polygonal plate 310 is moved along the trajectory, and kicks the limit switch 44*b*. The limit switch 44*b* supplies the detecting signal to the data processing unit 502. Then, the data processing unit 502 acknowledges that the impact absorbers 30*a*/30*b* and spacer 250 have already entered the blocking position and the space beneath the regulating buttons 23. The data processing unit 502 instructs the motor driver 43 to remove the driving voltage from the electric motor 510*a*. The motor driver 43 removes the driving voltage from the electric motor 150*a*. Then, the electric motor 150*a* stops the rotation.

On the other hand, when the user instructs the data processing unit 502 to change the operation from the silent mode to the acoustic mode, the data processing unit 502 supplies the control signal representative of the acoustic mode to the motor driver 43. The motor driver 43 determines the direction of the rotation, and adjusts the driving voltage to the opposite polarity. The motor driver 43 applies the driving voltage to the electric motor 150*a*. The electric motor 150*a* rotates the output shaft 301*a*, and the polygonal plate 310 is moved along the trajectory. The torque is transmitted through the transmission mechanisms 160/170 to the two parts 30A/30B of the hammer stopper 30 and the timing changer 260. When the polygonal plate 310 arrives at the limit switch 44*a*, the limit switch 44*a* turns on, and supplies the detecting signal to the data processing unit 502. The data processing unit 502 acknowledges that the impact absorbers 30*a*/30*b* and spacer 250 have entered the free position and the space out of the trajectories of the toes 12Ba. Then, the data processing unit 502 instructs the motor driver 43 to stop the driving voltage. Thus, the actuator 150 concurrently changes the hammer stopper 30 and timing changer 260 between the positions in the silent mode and the other positions in the acoustic sound mode by means of the transmission mechanisms 160/170.

Turning back to FIG. 2 of the drawings, the electronic tone generator 500 comprises the manipulating panel 501, the data processing unit 502, a tone generator 503, a headphone 504 and an array of key sensors 505. The user changes the timbre of the electronic tones, volume and so forth through the switches on the manipulating panel 501. The array of key sensors 505 is provided under the keyboard, and is connected to the signal port of the data processing unit 502. The key sensors 505 monitor the black/white keys 7, respectively, and periodically supply key position signals representative of the current key positions on the trajectories of the associated black/white keys 7 to the signal port of the data processing unit 502. The microprocessor periodically checks the signal port to see whether or not any one of the black/white keys changes the current position. When the microprocessor notices that the pianist depresses one of the black/white keys 7 through the analysis on the series of current key positions, the microprocessor specifies the black/white key 7, and calculates the key velocity. The microprocessor produces music data codes representative of the note-on, a key code assigned the depressed key and the key velocity, and supplies the music data codes to the tone generator 503. The tone generator 503 produces an audio signal on the basis of the music data codes, and supplies the audio signal to the headphone 504. The electronic tone, which has the pitch identical with the pitch of the acoustic tone to be generated from the associated strings 9, is radiated from the headphone.

On the other hand, when the microprocessor noticed that the pianist released the depressed key 7, the microprocessor produces music data codes representative of the note-off and the key code assigned the released key 7, and supplies the music data codes to the tone generator 503. The tone generator decays the audio signal, and the electronic tone is extinguished.

Transition to Silent Mode

FIGS. 2, 4 and 5 illustrate the composite keyboard musical instrument in the acoustic mode. When a pianist instructs the data processing unit 502 through the change-over switch 41 to establish the composite keyboard musical instrument in the silent mode, the electric motor 150 rotates the output shaft 301*a* in the counter clockwise direction, and the polygonal plate 310 is rotated together with the output shaft 301*a*. The polygonal plate 310 pulls the connecting rod 311, and gives rise to the rotation of the arm 312 in the clockwise direction. The arm 312 rightward pulls the connecting rode 313 in FIG. 4, and gives rise to the rotation of the arm 314 in the counter clockwise direction. The impact absorber 30*a* is rotated together with the arm 314, and enters the blocking position (see FIG. 11).

The arm 312 further rightward pulls the pushing rod 240 in FIG. 4, and causes the pushing rod 240 to remove the force from the pad 261*a*. Then, the spring (not shown) gives rise to the rotation of the framework 245 in the counter clockwise direction. For this reason, the spacer 250 enters the space beneath the regulating button 23.

Figure 12:
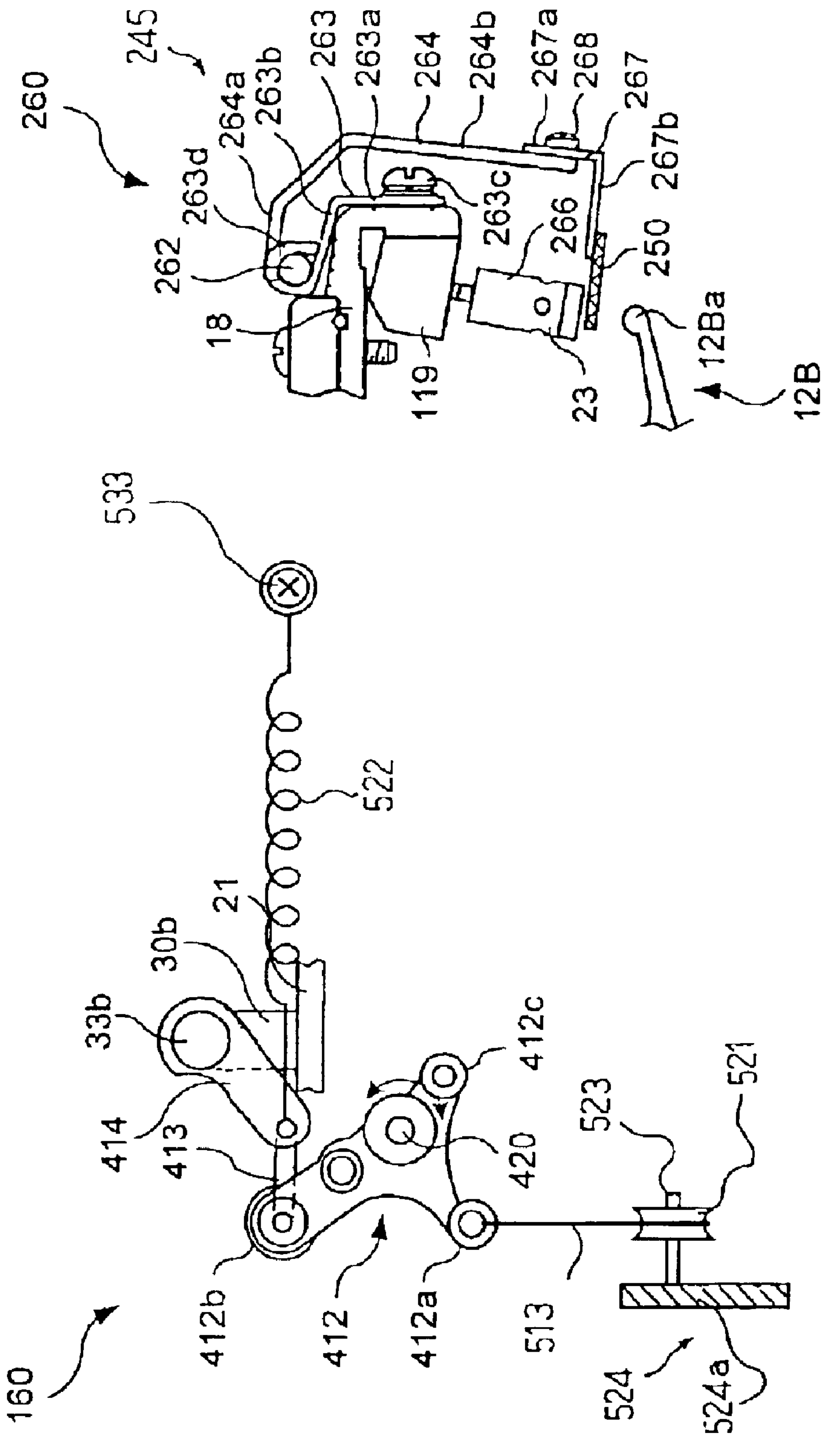
FIG. 12 is a side view showing the structure of the left part of the hammer stopper and timing changer in the silent mode.

While the polygonal plate 310 is rotating in the counter clockwise direction, the polygonal plate 310 continuously exerts force on the strap 513 in the downward direction. The pulley 511, the guide members 523/524 and pulley 521 change the direction of the force, and the strap 513 downwardly pulls the projection 412*a* of the arm 412 against the elastic force of the spring 522. The arm 412 is driven for rotation in the counter clockwise direction in FIG. 5 against the elastic force of the spring 522, and leftward pulls the connecting rode 413. The connecting rode 413 gives rise to the rotation of the arm 414 in the clockwise direction, and the impact absorber 30*b* enters the blocking position as shown in FIG. 12. When the impact absorbers 30*a*/30*b* and timing changer 260 enter the blocking position and the space beneath the regulating buttons 23, the polygonal plate 310 makes the limit switch 44*b* turn on. The limit switch 44*b* supplies the detecting signal to the data processing unit 502, and the data processing unit 502 acknowledges that the composite keyboard musical instrument has been already changed to the silent mode. Then, the data processing unit 502 supplies the control signal to the motor driver 43, and causes the motor driver 43 to stop the driving voltage.

Thus, the actuator 150 is shared among the two parts 30A/30B of the sprit hammer stopper 30' and the timing changer 260, and the connecting rode 311 and the arm 312 are shared between the hammer stopper 30 and the timing changer 260. The strap 513 is flexible, and, accordingly, propagates the force to the left part 30B with assistance of the pulleys 511/521 and the guide members 523/524. The bulky links are not required for the transmission of the force. For this reason, the transmission mechanism 170 is much simpler than the prior art link mechanism, and makes the work for retrofitting an acoustic piano to the composite keyboard musical instrument easy.

Transition to Acoustic Sound Mode

Figure 11:
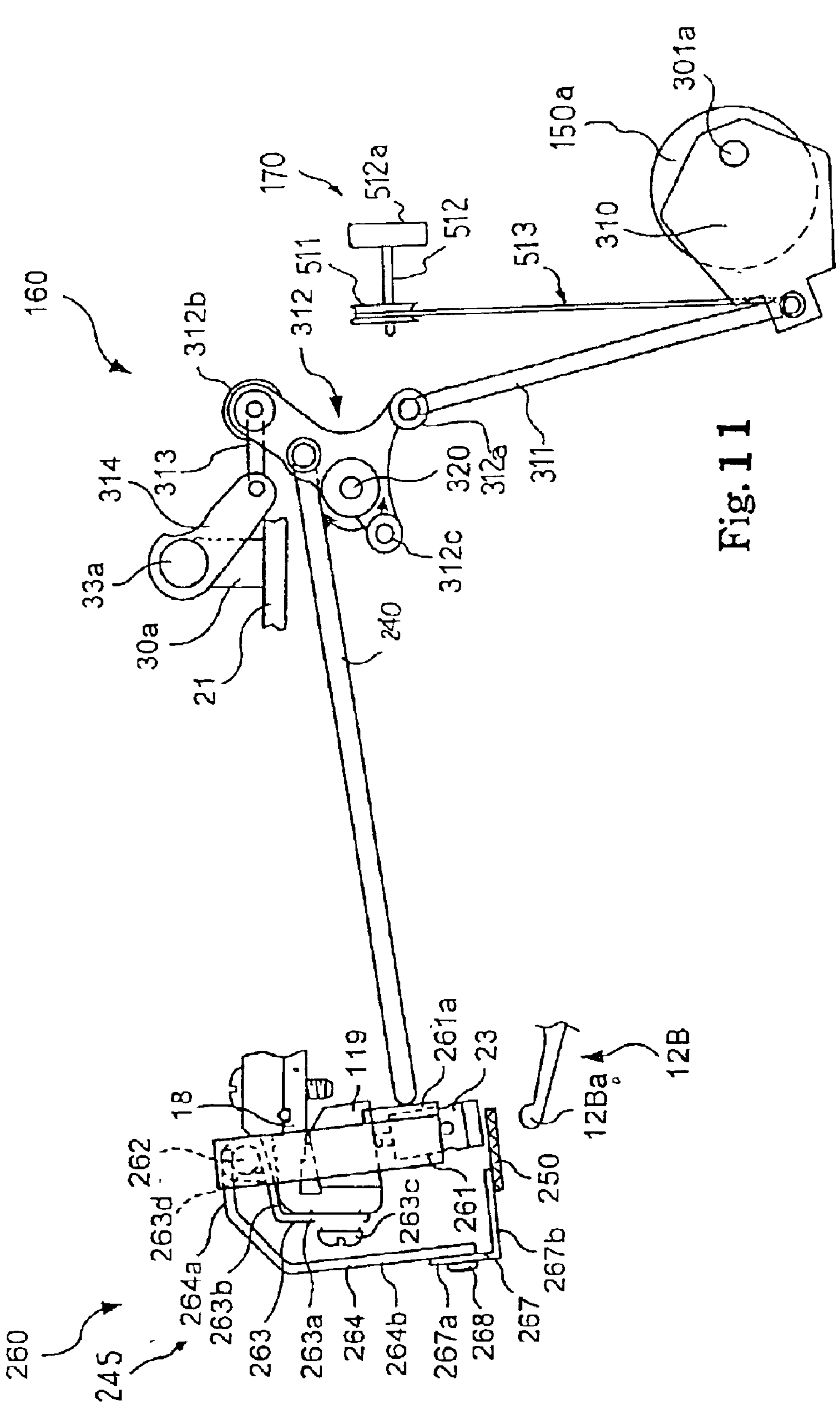
FIG. 11 is a side view showing the structure of the right part of the hammer stopper and timing changer in a silent mode.

The composite keyboard musical instrument in the silent mode is illustrated in FIGS. 11 and 12. The user is assumed to instruct the silent system to establish the composite keyboard musical instrument in the acoustic sound mode. The user manipulates the change-over switch 41 to the acoustic sound mode. The mode signal is supplied from the change-over switch 41 to the data processing unit 502, and the data processing unit 502 acknowledges the user's intention. The data processing unit 502 supplies the control signal representative of the acoustic sound mode to the motor driver 43. The motor driver 43 inverts the polarity of the driving voltage, and supplies the driving voltage to the electric motor 150*a*. The electric motor rotates the output shaft 301*a* in the clockwise direction in FIG. 11, and the polygonal plate 310 is rotated together with the output shaft 301*a*. The polygonal plate 310 pushes the connecting rod 311, and gives rise to the rotation of the arm 312 in the counter clockwise direction. The arm 312 leftward pushes the connecting rode 313 in FIG. 11, and gives rise to the rotation of the arm 314 in the clockwise direction. The impact absorber 30*a* is rotated together with the arm 314, and enters the free position (see FIG. 4).

The arm 312 further leftward pushes the pushing rod 240 in FIG. 11, and causes the pushing rod 240 to exert the force on the pad 261*a*. The pushing rod 240 gives rise to the rotation of the framework 245 in the clockwise direction against the elastic force of the spring (not shown), and the spacer 250 is rotated together with the framework 245. As a result, the spacer 250 vacates the space beneath the regulating button 23 as shown in FIG. 4.

While the polygonal plate 310 is rotating in the clockwise direction, the polygonal plate 310 does not pull the strap 513 any more, and the spring 522 is shrunk. The spring 522 pulls the strap 513, and the elastic force is transmitted through the strap 513 to the polygonal plate 310. For this reason, the strap 513 is not loosened during the rotation of the polygonal plate 310 in the clockwise direction.

The spring 522 rightward pulls the connecting rod 413, and gives rise to rotation of the arm 414 in the counter clockwise direction and rotation of the arm 412 in the clockwise direction in FIG. 12. The arm 412 pulls the strap 513, and the arm 414 makes the impact absorber 30*b* rotated together. The impact absorber 30*b* vacates the trajectories of the hammer shanks 21, and enters the free position as shown in FIG. 5.

When the impact absorbers 30*a*/30*b* and the spacer 250 vacate the trajectories of the hammer shanks 21 and the trajectory of the toes 12Ba, the polygonal plate 310 makes the limit switch 44*a* turn on, and the detecting signal is supplied from the limit switch 44*a* to the data processing unit 502. The data processing unit 502 acknowledges that the composite keyboard musical instrument has entered the acoustic sound mode, and supplies the control signal to the motor driver 43. Then, the motor driver 43 removes the driving voltage from the electric motor 150*a*, and the electric motor 150*a* stops the output shaft 301*a* and the polygonal plate 310.

Thus, only one actuator exerts the torque on the hammer stopper 30 and timing changer 260 through the transmission mechanisms 160/170. The strap 513 propagates the torque from the polygonal plate 310 to the left part 30B of the hammer stopper 30 in the transmission mechanism 170. The strap 513 is simpler and more economical than any link mechanism. Thus, the silent system 6 according to the present invention is conducive to reduction in production cost.

Acoustic Sound Mode

When the impact absorbers 30*a* and spacer 250 vacate the trajectories of the hammer shanks 21 and toes 12Ba, the composite keyboard musical instrument is established in the acoustic sound mode. A pianist is assumed to sit on a chair in front of the keyboard for playing a piece of music. While the pianist is playing the piece of music on the keyboard in the acoustic sound mode, the depressed keys 7 actuates the associated action units 8, and the released keys 7 permit the associated action units 8 to be recovered to the rest positions.

While a key 7 is sinking toward the end position, the capstan screw 14 pushes the whippen assembly 11*a*, and gives rise to the rotation of the whippen assembly 11*a* about the whippen flange 11*b* in the clockwise direction in FIG. 2. The jack 12 is also rotated about the whippen flange 11*b*, and the toe 12Ba is getting close to the regulating button 23. The jack 12 pushes the roller 22 so that the hammer 13 is rotated around the shank flange 19. When the toes 12Ba is brought into contact with the regulating buttons 23, the jack 12 escapes from the associated hammer 13, and the hammer 13 strikes the string 9 without any interruption by the hammer stopper 30. For this reason, the piano tones are generated from the vibrating strings 9.

The hammer rebounds on the string 9, and is received by the hammer shank stop felt 11*c*. When the pianist releases the depressed key 7, the whippen assembly 11*a* is rotated in the counter clockwise direction, and the toe 12Ba is spaced from the regulating button 23. The jack 12 slides under the roller 22. Thus, the action unit 8 returns to the rest position as shown in FIG. 2.

Silent Mode

When the impact absorbers 30*a*/30*b* and spacer 250 enter the trajectories of the hammer shanks 21 and the toes 12Ba as shown in FIGS. 11 and 12, the composite keyboard musical instrument is established in the silent mode.

After entry into the silent mode, the pianist is assumed to start the fingering on the keyboard. While the pianist is fingering on the black/white keys 7, the associated action units 8 are selectively actuated by the depressed keys 7, and return to the rest positions after the release of the keys 7.

When an action unit 8 is actuated, the whippen assembly 11*a* is rotated about the whippen flange 11*b* in the clockwise direction, and the toe 12Ba advances toward the regulating button 23. The toe 12Ba is brought into contact with the spacer 250, and the reaction gives rise to the rotation of the jack 12 about the whippen assembly 11*a*. Then, the jack 12 escapes from the associated hammer 13, and the hammer 13 starts the free rotation about the shank flange 19. Thus, the spacer 250 hastens the escape of the jack 12, and the hammer 13 is never pinched between the jack 12 and the hammer stopper 30.

The hammer shank 21 is brought into contact with the impact absorber 30*a* or 30*b* before striking the string 9, and rebounds thereon. For this reason, any piano tone is not generated from the string 9. The hammer 13 is received by the hammer shank stop felt 11*c*, and returns to the rest position after the release of the depressed key 7.

While the pianist is fingering on the keyboard, the key sensors 505 supply the key position signals representative of the current key positions of the associated keys 7 to the signal port of the data processing unit 502. The data processing unit 502 produces the music data codes as described hereinbefore, and supplies the music data codes to the tone generator 503. The tone generator 503 produces the audio signal on the basis of the music data codes, and supplies the audio signal to the headphone 504. The headphone 504 converts the audio signal to the electronic tones corresponding to the piano tones, and the pianist confirms his or her fingering through the electronic tones.

The timing changer 260 hastens the escape of the jacks 12 in the silent mode, and prevents the hammer shanks 21 from being pinched between the jacks 12 and the impact absorbers 30*a*/30*b*. The timing changer 260 makes the player repeatedly depress a key 7, and rescues the action units 8 around the roller 22 from damages. Nevertheless, the timing changer 260 moves the spacer 250 out of the trajectories of the toes 12Ba in the acoustic sound mode so that the pianist feels the key-touch of the composite keyboard musical instrument same as that of the standard grand pianos.

As will be appreciated from the foregoing description, the silent system according to the present invention has the transmission mechanism 160 and 510, is shared among the two parts of the split hammer stopper 30/30' and the timing changer 260. The use of the strap 513 makes the link mechanism 170 simpler than that of the prior art composite keyboard musical instrument, and the simple link mechanism is conducive to reduction in production cost.

Retrofitting

Subsequently, description is made on a retrofitting work. Assuming now the acoustic piano 5 has been used at user's home, the user wants to practice the fingering without any piano tone, and requests the manufacturer to retrofit the acoustic piano 5 to the composite keyboard musical instrument. The manufacturer sends workers together with the silent system 6 to the user's home.

The workers install the hammer stopper 30, the timing changer 260 and the electronic tone generator 500 inside the piano case. When the workers assembles the hammer stopper 30 with the piano case, the workers secure the brackets 131/132 and the brackets 350*a* to the projection 130 and the inner surface of the side board 15*d*. The brackets 131/132 are secured to the projection 130 by means of the bolts 136 and the nuts 137 without any machining on the projection 130 as described hereinbefore. Neither large tool nor jig is required, and the brackets 131/132 are secured to the projection 130 within a short time. Moreover, the projection 130 does not lose the mechanical strength, because any through-hole is not formed therein. The iron frame is less deformed, and the string height is not varied after a long service time. Thus, the projection 130 keeps the iron frame strong against the large amount of tension due to the strings 9.

Subsequently, the self-adjusting bearing units 132*b* are mounted on the brackets 131/132 and the brackets 350*a*, and the shafts 33*a*/33*b* are rotatably supported by the self-adjusting bearing units 132*b*. Even if a small amount of misalignment takes place, the self-adjusting bearing units 132*b* absorb the misalignment. Thus, the usage of the self-adjusting bearing units 132*b* makes the assembling work easy. Moreover, the split hammer stopper, i.e., two parts 30A/30B are independently supported by the two pairs of self-aligned bearing units 132*b*, and this feature is desirable for the hammers 13. The height of the strings 9 is different between the lower pitched part and the higher/middle pitched parts. Even so, the two parts 30A/30B are independent of each other, and the workers adjust the two parts 30A/30B to associated strings 9.

The electric motor 150*a* is fixed to a bracket 305, which in turn is fixed to the beam 351. The timing changer 260 is rotatably supported by the shank flange rail 18. The output shaft 301*a* of the electric motor 150*a* is connected through the transmission mechanism 160 to the right part 30A of the hammer stopper 30 and the timing changer 260 and through the transmission mechanism 170 to the left part 30B of the hammer stopper 30. The polygonal plate 310 is fixed to the output shaft 301*a*, and the transmission mechanism 160/170 are connected to the polygonal plate 310.

The manipulating panel 501 is attached to the front surface of the key bed 15*c*, and the electric components 502, 503, 43 and 44*a*/44*b* are appropriately arranged in the acoustic piano 5.

Even if the string height has been made different due to the deformation of the iron frame, the workers independently regulate the parts 30A/30B of the hammer stopper 30 to the appropriate height. In other words, the workers take the difference in the string height between the high/middle registers and the low register into account, and fix the two parts 30A/30B to the brackets 131/132/350*a*. Thus, the split hammer stopper 30 makes the assembling work easy.

The link mechanism is so simple that the workers complete the retrofitting work within a short time period. Especially, the workers easily route the strap 513. Thus, the split hammer stopper 30, the transmission mechanisms 160/170 and the timing changer 260 is conducive to reduction of the cost for retrofitting.

In the above-described embodiment, the strings 9 are corresponding to the plural vibratory members, and the hammers 13 serve as the plural vibration generators. The electric motor 150*a* is an example of rotating machines, and a solenoid unit is an example of reciprocating machines.

Although a particular embodiment of the present invention has been shown and described, it will be apparent to those skilled in the art that various changes and modifications may be made without departing from the spirit and scope of the present invention.

The timing changer may be connected to the transmission mechanism 170 instead of the transmission mechanism 160.

The strap 513 may be connected to a component part of the transmission mechanism 160 or another part added between the actuator 150 and the transmission mechanism 160. Similarly the spring 522 may be connected to another component part of the transmission mechanism 170 such as the arm 414 or 412. Another part may be added to the transmission mechanism 170 in order to connect the spring 522 to the part. Otherwise, the spring 522 may be directly connected to the left part 30B of the hammer stopper 30.

The spring 522 may be replaced with another sort of power generator such as, for example, a pair of magnet pieces. One of the magnet pieces is fixed to the left part 30B of the hammer stopper 30, and the other magnet piece is fixed to a piano case. The pieces of magnet repel each other, or are attracted to each other. The actuator 150 exerts the torque on the left part 30B against the magnetic force through the transmission mechanism 170, and permits the pieces of magnet to move the left part 30B.

Figure 13:
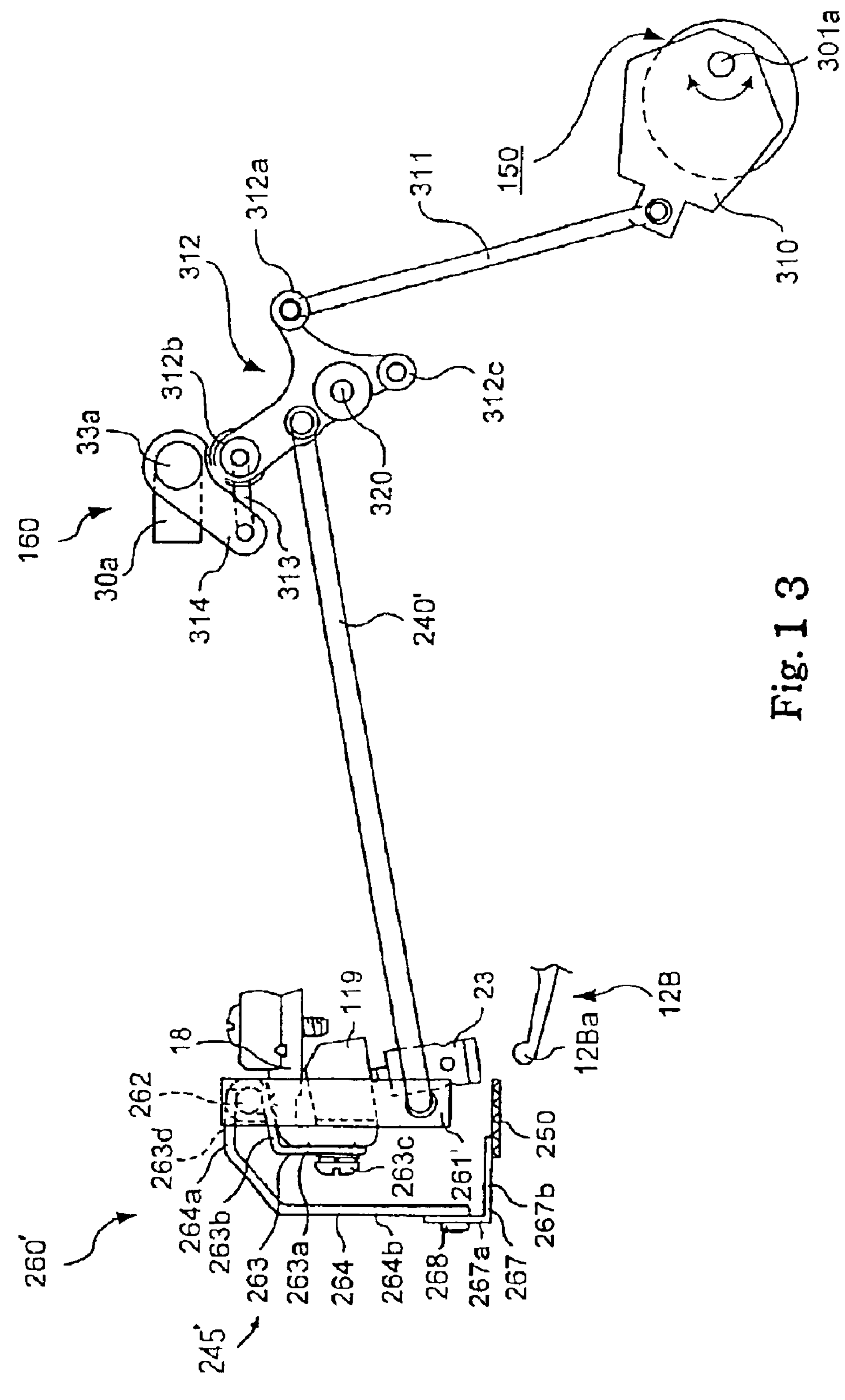
FIG. 13 is a side view showing the structure of a modification of the timing changer.

The timing changer 260 may be modified as shown in FIG. 13. The timing changer 260' comprises a pushing rod 240', a framework 245' and the spacer 250. The difference between the timing changers 260 and 260' is the pushing rod 240' rotatably connected to the framework 245'. As described hereinbefore, the framework 245 is urged to the pushing rod 240 by means of the spring. On the other hand, the pushing rod 240' is bent at the leading end, and a hole is formed in the arm 261'. The leading end is inserted into the hole, and is rotatably connected to the arm 261'. When a user changes the operation to the silent mode, the pushing rod 240' is rightward pulled, and gives rise to the rotation of the framework 245' in the counter clockwise direction. On the other hand, when the user changes the operation to the acoustic sound mode, the pushing rod 240' leftward pushes the framework 245', and makes the spacer 250 vacate the space beneath the regulating buttons 23.

The silent system may comprises the hammer stopper 30, actuator 150, transmission mechanisms 160/170 and the timing changer 260. In other words, the electronic tone generator 500 may be removed from the silent system. Although the pianists can not confirm the fingering through the electronic tones, the pianists practice the fingering without disturbance to the neighborhood.

The actuator 150 may have another sort of power source such as, for example, a solenoid unit. In this instance, the solenoid is fixed to the piano case, and the plunger is connected to the polygonal plate 310. The polygonal plate 310 is rotatably supported by a suitable bracket. When the solenoid is energized, the plunger projects from the solenoid, and gives rise to the rotation of the polygonal plate 310. On the other hand, when the electric power is removed from the solenoid, the plunger is retracted into the solenoid, and the polygonal plate 310 is rotated in the vice versa.

The user may be the power source. The transmission mechanisms 160/170 are connected to a grip or a foot pedal. When the user manipulates the grip or steps on the foot pedal, the force is exerted on the hammer stopper 30 and the timing changer 260 through the transmission mechanisms 160/170.

The timing changer may accelerate the escape of the jack through a different mechanism such as, for example, the timing changer disclosed in Japanese Patent Application laid-open No. 7-319452. The timing changer disclosed in the Japanese Patent Application laid-open has the jacks formed with bumps between the toes and the axes of rotation. While a pianist is playing a piece of music in the acoustic sound mode, the toes are brought into contact with the toes, and the reaction causes the jacks to escape from the hammers. When the user changes the keyboard musical instrument to the silent mode, auxiliary regulating buttons enter the trajectories of the bumps, or the regulating buttons are directed to the bumps. When the pianist depresses a key, the depressed key gives rise to the rotation of the whippen assembly about the whippen flange. The bump is brought into contact with the auxiliary regulating button or the regulating button earlier than the toe so that the jack escapes from the hammers earlier in the silent mode than the acoustic sound mode. In this instance, the force is transmitted through the transmission mechanism 160 or 170 to the auxiliary regulating buttons or regulating buttons.

The hammer stopper 30 may be closer to the strings 9 than those of the above-described keyboard musical instrument. In this instance, the keyboard musical instrument is changed between the acoustic sound mode and a muting mode. In the muting mode, the hammers 13 faintly strike the strings 9 at the rebound on the hammer stopper so that the acoustic tones are faintly generated.

The hammer stopper 30 may be split into more than two parts. In case where the hammer stopper 30 is split into three parts. The three parts are assigned the higher pitched part, middle pitched part and lower pitched part, respectively. One of the transmission mechanisms such as 160 is connected to the higher pitched part, and the other transmission mechanism 170 is connected to the middle and lower pitched parts. In this instance, two straps may be connected between the actuator and the middle and lower pitched parts in parallel.

The composite keyboard musical instrument may be based on another sort of keyboard musical instruments such as, for example, a celesta and an upright piano.

Figure 14:
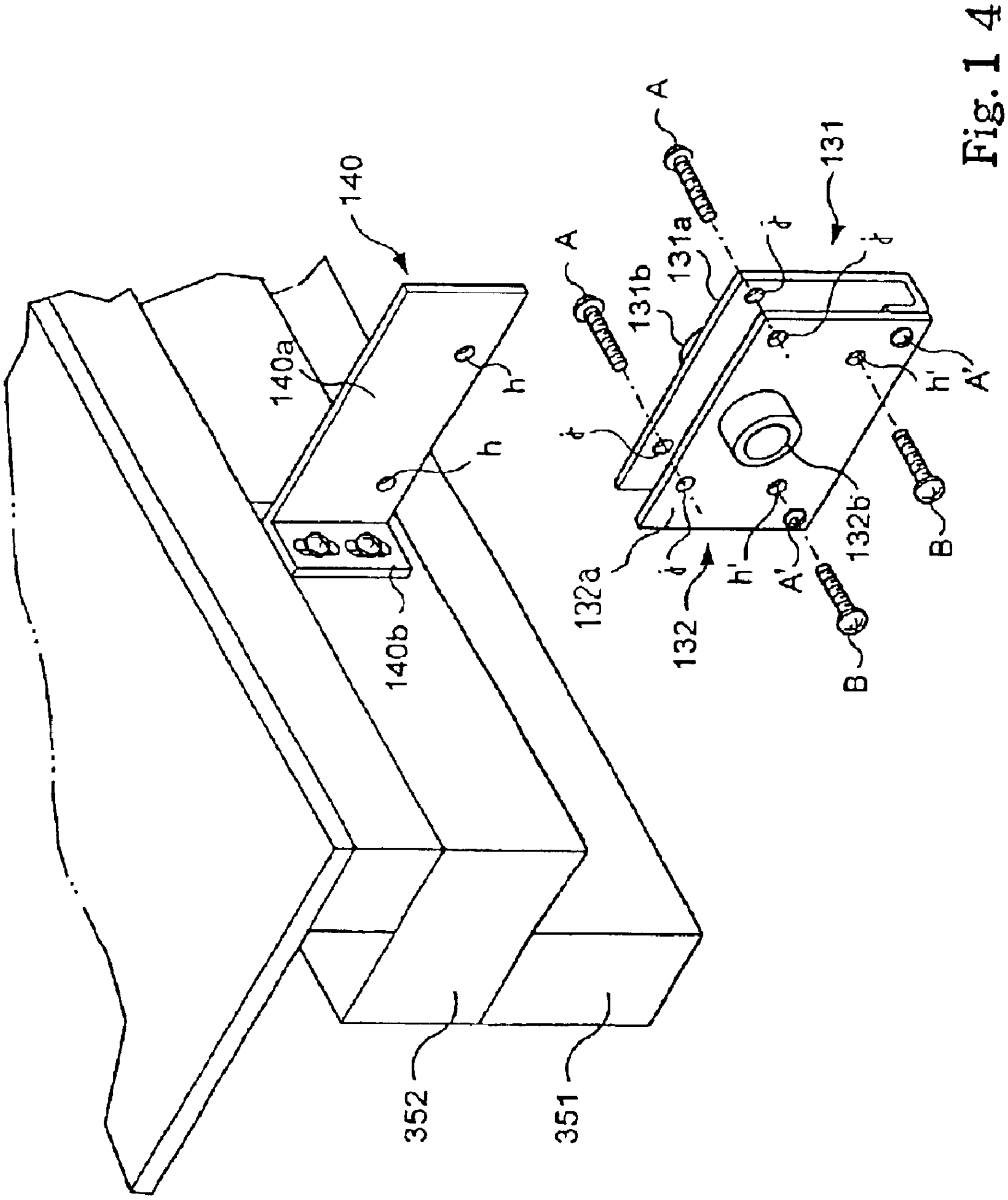
FIG. 14 is a perspective view showing brackets bolted to the beam of a grand piano for installing a split type hammer stopper in the grand piano.

The split type hammer stopper 30 is proper to an acoustic piano having the iron frame reinforced with the projection 130. Nevertheless, the split type hammer stopper 30 is available for grand pianos having iron frames without any projection. FIG. 14 shows a grand piano. The iron frame of the grand piano is not formed with any projection. In order to install the split type hammer stopper, a bracket 140 is bolted to the beam 352. The bracket 140 has an L-letter shape. The base portion 140*b* is formed with elongated holes, and is secured to the beam 352 by means of screw bolts. Through-holes h are formed in the projecting portion 140*a*, and frontward projects from the beam 352. The through-holes h are spaced from each other by a predetermined distance. Two bearing plates 131 and 132 are used for the shafts 33*a*/33*b*. The bearing plate 131 has a J-letter shape, and the other bearing plate 132 is flat. The bearing plates 131/132 have the self-aligning bearings 131*b*/132*b* which project from supporting plates 131*a*/132*a*. Female screws j/h' are formed in the supporting plates 131*a*/132*a*. The female screws h' are spaced from each other by the predetermined distance, and are to be aligned with the through-holes h, respectively. The bearing plates 131/132 are assembled together by means of bolts A'. A space is defined between the two bearing plates 131 and 132, and the projecting portion 140*a* is inserted into the space. The through-holes h are aligned with the female screws h', and bolts B are screwed into the female screws h' through the holes h. Since the distance between the female screws h' and the female screws j is greater than the distance between the through-holes h and the upper surface of the projecting portion 140*a*, the female screws j are opposed to each other. Bolts A are screwed into the female screws j, and the bearing plates 131/132 are fixed to the bracket 140. The shafts 33*a* and 33*b* are supported by the self-aligning bearing units 131*b* and 132*b*, and the other ends of the shafts 33*a*/33*b* are supported by other self-aligning bearings on the brackets 350*a*.

The self-aligning bearing units 131*b*/132*b* may be fixed to a single supporting plate secured to the bracket 140. Otherwise, the bearing plate or plates may be directly secured to the beam 352 or 351. The bracket 140 may be used in the grand piano having the iron frame reinforced with the projection for supporting the shafts 33*a*/33*b*.

What is claimed is:

1. A silent system for forming a part of a composite keyboard musical instrument, comprising:

a stopper provided between vibratory members and vibration generators, and split into plural parts independently movable between respective free positions and respective blocking positions;

an actuator for generating a power;

a timing changer for changing a timing at which said vibration generators initiate motion; and plural transmission mechanisms selectively connected between said plural parts and said timing changer, and transmitting said power to said plural parts for concurrently changing said plural parts between said respective free positions and said respective blocking positions and to said timing changer so as to cause said timing changer to change said timing.

2. The silent system as set forth in claim 1, in which said plural transmission mechanisms are arranged in parallel between said plural parts and said timing changer.

3. The silent system as set forth in claim 2, in which at least one of said transmission mechanisms includes a non-extensible flexible strap for transmitting said power from said actuator to the associated part of said stopper.

4. The silent system as set forth in claim 3, in which said non-extensible flexible strap is made from yarn or a bundle of yarns.

5. The silent system as set forth in claim 3, in which said non-extensible flexible strap is made from rope.

6. The silent system as set forth in claim 3, in which said non-extensible flexible strap is made from silkworm gut.

7. The silent system as set forth in claim 3, in which said non-extensible flexible strap is made from wire.

8. The silent system as set forth in claim 7, in which said wire is selected from the group consisting of stranded steel wire, plastic wire and carbon wire.

9. The silent system as set forth in claim 2, in which said actuator includes a power source selected from the group consisting of rotating machines, reciprocating machines and a human being.

10. The silent system as set forth in claim 2, in which at least one of said plural transmission mechanisms includes a series of links connected between said actuator and one of said plural parts of said stopper, and another of said plural transmission mechanism includes a series of links connected at one end thereof to another of said plural parts and a strap connected between the other end of said series of links and said actuator.

11. The silent system as set forth in claim 2, further comprising an electronic tone generator monitoring keys and producing electronic tones corresponding to acoustic tones generated from said plural vibratory members on the basis of the motion of said keys.

12. A composite keyboard musical instrument selectively entering an acoustic sound mode and another mode for reducing the loudness of acoustic tones, comprising:

plural keys respectively assigned pitches different from one another, and independently moved between respective rest positions and respective end positions;

plural vibratory members respectively associated with said plural keys for generating said acoustic tones having the pitches identical with the pitches assigned to the associated keys in said acoustic sound mode;

plural vibration generators associated with said plural vibratory members, respectively, and selectively moved along respective trajectories for generating vibrations in the associated vibratory members;

plural action units respectively connected between said plural keys and said plural vibration generators, and causing the associated vibration generators to initiate the motion along the trajectories at a timing on the way toward the end positions after the associated keys start the motion toward said end positions; and a silent system including a stopper provided between said plural vibratory members and said plural vibration generators for causing said vibration generators to rebound thereon in said another mode and split into plural parts independently movable between respective free positions in said acoustic sound mode and respective blocking positions in said another mode, an actuator for generating a power, a timing changer for changing said timing at which said vibration generators initiate said motion, and plural transmission mechanisms selectively connected in parallel between said plural parts and said timing changer and transmitting said power to said plural parts for concurrently changing said plural parts between said respective free positions and said respective blocking positions and to said timing changer for causing said timing changer to change said timing.

13. The composite keyboard musical instrument as set forth in claim 12, in which one of said plural transmission mechanisms includes a non-extensible flexible strap for transmitting said power from said actuator to at least one of said plural parts of said stopper.

14. The composite keyboard musical instrument as set forth in claim 13, in which said non-extensible flexible strap is made from a material selected from the group consisting of a yarn, a bundle of yarns, rope, silkworm gut, wire and stranded wire.

15. The composite keyboard musical instrument as set forth in claim 12, in which said actuator includes a power source selected from the group consisting of rotating machines, reciprocating machines and a human being.

16. The composite keyboard musical instrument as set forth in claim 12, in which at least one of said plural transmission mechanisms includes a series of links connected between said actuator and one of said plural parts of said stopper, and another of said plural transmission mechanism includes a series of links connected at one end thereof to another of said plural parts and a strap connected between the other end of said series of links and said actuator.

17. The composite keyboard musical instrument as set forth in claim 12, in which two of said plural parts of said stopper is provided on both sides of a projection projecting from a frame over which said vibratory members are stretched and incorporated in a grand piano.

18. The composite keyboard musical instrument as set forth in claim 17, in which said stopper further includes a bracket secured to said projection, other brackets secured to inner surfaces of a piano case of said grand piano and self-aligning bearing units provided on said bracket and said other brackets for rotatably supporting said parts.

19. The composite keyboard musical instrument as set forth in claim 12, in which said timing changer includes a framework rotatably supported by a stationary member in the vicinity of said action units, a spacer secured to said framework and a rod held in contact with said framework at one end thereof, and one of said plural transmission mechanism is connected at one end thereof to said actuator and at the other end thereof to the other end of said rod and at least one of said plural parts of said stopper.

20. The composite keyboard musical instrument as set forth in claim 12, in which said silent system further includes brackets secured to a case, and self-aligning bearing units are mounted on said brackets for rotatably supporting said plural parts of said stopper.

21. The composite keyboard musical instrument as set forth in claim 12, in which said silent system further includes an electronic tone generator monitoring said plural keys and producing electronic tones corresponding to said acoustic tones on the basis of the motion of said keys.

* * * * *